United States Patent
Humer et al.

(10) Patent No.: US 12,460,214 B2
(45) Date of Patent: *Nov. 4, 2025

(54) POLYPEPTIDES WITH PEROXIDASE ACTIVITY

(71) Applicant: TECHNISCHE UNIVERSITÄT WIEN, Vienna (AT)

(72) Inventors: Diana Humer, Vienna (AT); Oliver Spadiut, Vienna (AT)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 522 days.

This patent is subject to a terminal disclaimer.

(21) Appl. No.: 17/914,215

(22) PCT Filed: Mar. 24, 2021

(86) PCT No.: PCT/EP2021/057518
§ 371 (c)(1),
(2) Date: Sep. 23, 2022

(87) PCT Pub. No.: WO2021/191245
PCT Pub. Date: Sep. 30, 2021

(65) Prior Publication Data
US 2023/0183717 A1    Jun. 15, 2023

(30) Foreign Application Priority Data

Mar. 24, 2020 (EP) ................................. 20165108
Apr. 2, 2020 (EP) ................................. 20167727

(51) Int. Cl.
*C12N 9/08* (2006.01)
*C12N 15/70* (2006.01)

(52) U.S. Cl.
CPC ........... *C12N 15/70* (2013.01); *C12N 9/0065* (2013.01)

(58) Field of Classification Search
None
See application file for complete search history.

(56) References Cited

U.S. PATENT DOCUMENTS

| 9,540,617 | B2 | 1/2017 | Yokoyama |
| 2014/0363837 | A1 | 12/2014 | Krainer et al. |
| 2015/0140574 | A1 | 5/2015 | Yokoyama et al. |

FOREIGN PATENT DOCUMENTS

| WO | WO0172999 A1 | 10/2001 |
| WO | WO2008075325 A2 | 6/2008 |

OTHER PUBLICATIONS

Devos et al., (Proteins: Structure, Function and Genetics, 2000, vol. 41: 98-107).*
Whisstock et al., (Quarterly Reviews of Biophysics 2003, vol. 36 (3): 307-340,).*
Witowski et al., (Biochemistry 38:11643-11650, 1999.*
Kisselev L., (Structure, 2002, vol. 10: 8-9).*
Slotte T et al. "Capsella rubella peroxidase", Jun. 26, 2013, XP05568912, Retrieved from the Internet: URL: https://www.uniprot.org/uniprot/R0FP47.txt.
Anonymous: "Predicted: peroxidase 34-like [Camelina sativa]—Protein—NCBI", Nov. 29, 2016, XP055689815, URL: https://www.ncbi.nlm.nih.gov/protein/XP_010503561.
Humer D, Spadiut O "Improving the Performance of Horseradish Peroxidase by Site-Directed Mutagenesis", Int. J. Mol. Sci. 2019, 20, 916.
Capone S et al."Glyco-variant library of the versatile enzyme horseradish peroxidase", Glycobiology vol. 24 No. 9 pp. 852-863, 2014.
Sedigheh Asad et al."Investigating the Structural and Functional Effects of Mutating Asn Glycosylation Sites of Horseradish Peroxidase to Asp", Applied Biochemistry and Biotechnology; Part A: Enzyme Engineering and Biotechnology, Humana Press Inc. New York, vol. 164, No. 4, Dec. 31, 2010. Abstract only.
Morawski B et al."Functional Expression and Stabilization of Horseradish Peroxidase by Directed Evolution in *Saccharomyces cerevisiae*", Biotechnology and Bioengineering, vol. 76, No. 2, Sep. 2001.
Ryan B et al."Effects of single mutations on the stability of horseradish peroxidase to hydrogen peroxide", Biochimie 89 (2007) 1029-1032.
Andreescu et al "Nanostructured materials for enzyme immobilization and biosensors", The New Frontiers of Organic and Composite Nanotechnology, Chapter 7, 355-394.
Aumiller W et al "Coupled Enzyme Reactions Performed in Heterogeneous Reaction Media: Experiments and Modeling for Glucose Oxidase and Horseradish Peroxidase in a PEG/Citrate Aqueous Two-Phase System", dx.doi.org/10.1021/jp501126v | J. Phys. Chem. B 2014, 118, 2506-2517.
Bagshawe KD "Antibody-directed enzyme prodrug therapy (ADEPT) for cancer", Expert Rev. Anticancer Ther. 6 (10), 1421-1431 (2006).
Bradford M "A Rapid and Sensitive Method for the Quantitation of Microgram Quantities of Protein Utilizing the Principle of Protein-Dye Binding", Analytical Biochemistry 72, 248-254 (1976).
Gajhede M et al "Crystal structure of horseradish peroxidase C at 2.15 A resolution", nature structural biology, vol. 4 No. 12, Dec. 1997.

(Continued)

*Primary Examiner* — Jennifer E Graser
(74) *Attorney, Agent, or Firm* — Daniel S. Kim

(57) ABSTRACT

The present invention provides a polypeptide having peroxidase activity and comprising an amino acid sequence having at least 70% sequence identity to SEQ ID NO: 3, wherein said amino acid sequence comprises at least one amino acid exchange compared to SEQ ID NO: 1, wherein said at least one amino acid exchange is an exchange of the amino acid P146 or of the amino acid N275 of SEQ ID NO: 1. The invention further relates to a nucleic acid molecule comprising a sequence encoding said polypeptide, an expression vector comprising said nucleic acid molecule, and a host cell comprising said expression vector. Moreover, methods for producing said polypeptide and compositions and kits comprising said polypeptides are provided.

14 Claims, 1 Drawing Sheet
Specification includes a Sequence Listing.

(56) References Cited

OTHER PUBLICATIONS

Gebauer et al "Engineered protein scaffolds as next-generation antibody therapeutics", Current Opinion in Chemical Biology, vol. 13, Issue 3, Jun. 2009, pp. 245-255, Abstract only.
Jin R et al "Enzymatically Crosslinked Dextran-Tyramine Hydrogels as Injectable Scaffolds for Cartilage Tissue Engineering", Tissue Engineering: Part A vol. 16, No. 8, 2010, 2429-2440.
Josephy Pd et al."The Horseradish Peroxidase-catalyzed Oxidationof 3,5,3',5'-Tetramethylbenzidine", The Journal of Biological Chemistry, vol. 257, No. 7, Issue of Apr. 10, pp. 3669-3675, 1982.
Pham Ltm et al "Optimized refolding and characterization of S-peroxidase (CWPO_C of Populus alba) expressed in *E. coli*", Protein Expression and Purification 80 (2011) 268-273.
Rengarajan et al "Quantifying DNA concentrations using fluorometry: A comparison of fluorophores", Molecular Vision 2002; 8:416-21.
Rice P et al."Emboss: The European Molecular Biology Open Software Suite", TIG Jun. 2000, vol. 16, No. 6.
Welinder K "Superfamily of plant, fungal and bacterial peroxidases", Current Opinion in Structural Biology 1992, 2:388-393.
Sarno et al "Immobilization of Horseradish Peroxidase on Fe3O4/ Au_GO Nanoparticles to Remove 4-Chlorophenols from Waste Water", Chemical Engineering Transactions, 73, 217-222.
Simpson R "Estimation of Free Thiols and Disulfide Bonds Using Ellman's Reagent", CSH Protocols; 2008; doi:10.1101/pdb. prot4699.
Tatsumi K et al."Removal of Chlorophenols from Wastewater by Immobilized Horseradish Peroxidase", Biotechnology and Bioengineering, vol. 51, pp. 126-130 (1996).
Tupper J et al."Use of horseradish peroxidase for gene-directed enzyme prodrug therapy with paracetamol", British Journal of Cancer (2004) 90, 1858-1862.
Tupper J et al."In vivo characterization of horseradish peroxidase with indole-3-acetic acid and 5-bromoindole-3-acetic acid for gene therapy of cancer", Cancer Gene Therapy (2010) 17, 420-428.
Vasileva N et al."Application of immobilized horseradish peroxidase onto modified acrylonitrile copolymer membrane in removing of phenol from water", International Journal of Biological Macromolecules 44 (2009) 190-194.
"Peroxidase C2", BAA14143.1, EMBL, Aug. 1, 1990, Aug. 1, 1990, Sequence Section.
Predicted: peroxidase 34-like, [Camelina sativa], CDS section. Nov. 29, 2016.

* cited by examiner

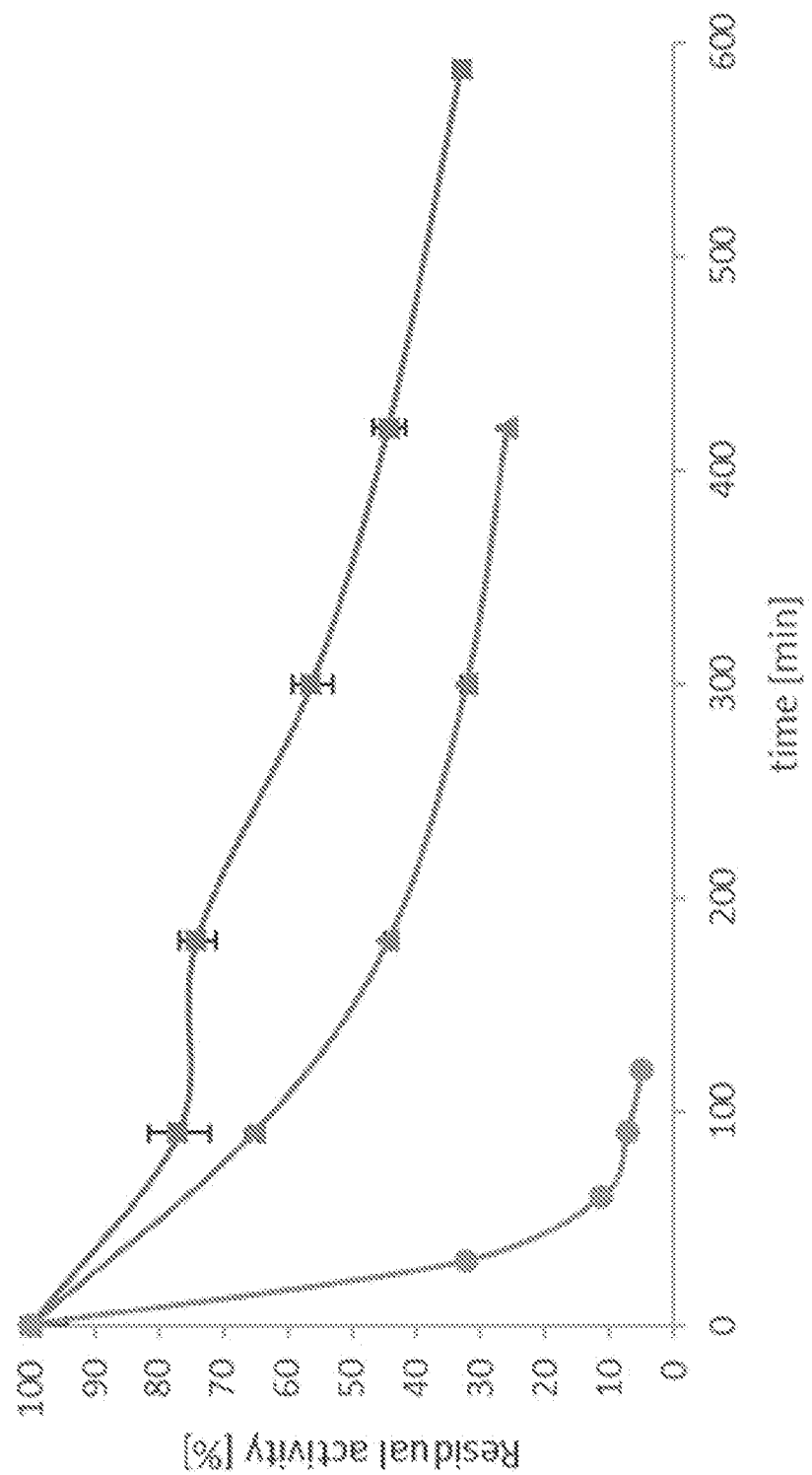

POLYPEPTIDES WITH PEROXIDASE ACTIVITY

The content of ASCII text file of the sequence listing named 128912-00002_SEQ.txt, which is 11861 bytes in size was created on and electronically submitted via EFS-Web Sep. 23, 2022, is incorporated herein by reference in its entirety.

This is the national stage of International Application PCT/EP2021/057518, filed Mar. 24, 2021.

The present invention relates to novel polypeptides with peroxidase activity.

Horseradish peroxidase (HRP) is an industrially important enzyme with a wide range of applications including immunoassays, diagnostic kits, probe-based assay techniques such as ELISA, EMSA, Western blotting and Southern blotting, waste water treatment, as a reagent in organic synthesis, and potential therapeutic applications.

To date, HRP is mainly produced by extraction from hairy root cultures of Armoracia rusticana. This, however, is an inefficient and time-consuming process. Disadvantages include low yields, long cultivation times, only seasonal availability, heterogeneous isoenzyme composition (preparations differ in biochemical properties), dependence on conditions during root growth, and plant glycosylation patterns which are immunogenic for humans and may result in non-eligibility for medical uses.

Recombinant production of HRP is a desirable alternative to hairy root culture as it is a more promising way of manufacturing that guarantees a steady supply of defined HRP preparations at high quality. In particular, recombinant production in E. coli may make it possible to obtain a defined preparation of one isoform with stable biochemical properties while lacking glycosylation and therefore immunogenic potential.

However, native plant-based HRP contains glycosylations on eight asparagine residues making recombinant production challenging. Wild-type HRP produced from E. coli shows extremely low stability compared to the plant-derived enzyme.

Numerous attempts have been made to produce HRP recombinantly in different hosts: mammalian cells, insect cells, yeasts (P. pastoris and S. cerevisiae), other plants (Nicotiana tabacum, Nicotiana benthamiana, Armoracia lapathifolia) and E. coli. However, these production strategies resulted in very low yields and/or decreased enzyme activity and stability. For production in E. coli this occurs due to intracellular production of the protein which leads to inclusion body formation due to reducing conditions in the E. coli cytoplasm. Therefore, the downstream process is more elaborate than, for example, in yeasts. The enzyme can also be translocated to the periplasm by adding a signal sequence but then the yields are even lower and the activity of the enzyme might be compromised by addition of the translocation-tag. Moreover, E. coli is not able to perform post-translational modifications, therefore the enzyme is unglycosylated which results in reduced stability of the protein.

Several studies have been performed in the past with the goal of improving the properties of recombinantly produced HRP. A summary of such attempts is provided by Humer and Spadiut ("Improving the performance of horseradish peroxidase by site-directed mutagenesis." International Journal of Molecular Sciences 20.4 (2019): 916), wherein the effect of a number of mutations on stability and/or enzymatic activity are disclosed.

However, despite all of these efforts, new and improved variants of HRP are still lacking. In particular, HRP mutants that can be recombinantly produced in suitable hosts, especially E. coli, and have improved stability and/or enzymatic activity are needed. It is an object of the present invention to provide such HRP mutants.

Therefore, the present invention provides a polypeptide having peroxidase activity and comprising an amino acid sequence having at least 70% sequence identity to SEQ ID NO: 3, wherein said amino acid sequence comprises at least one amino acid exchange compared to SEQ ID NO: 1, wherein said at least one amino acid exchange is an exchange of the amino acid P146 or of the amino acid N275 of SEQ ID NO: 1.

The present invention also provides a nucleic acid molecule comprising a sequence encoding the polypeptide according to the invention; an expression vector comprising the nucleic acid molecule according to the invention; and a host cell comprising the expression vector according to the invention.

The present invention further relates to a method for producing the polypeptide according to the invention, comprising the steps of culturing the host cell according to the invention and recovering said polypeptide.

In a further aspect the invention provides a composition comprising the polypeptide according to the invention. In yet a further aspect, the present invention provides a kit comprising the polypeptide or the kit according to the invention.

In the context of the present invention it was surprisingly found that the properties of HRP could be improved by introducing mutations at the positions proline-146 (P146) and/or asparagine-275 (N275) of wild-type HRP. In particular, it was found that such HRP mutants can be recombinantly produced in E. coli in high yields and good purity, display surprisingly good thermostability (see Example 2) and surprisingly high enzymatic activity (see Example 3). Even though a number of mutations of HRP have been investigated (see Humer and Spadiut, "Improving the performance of horseradish peroxidase by site-directed mutagenesis." International Journal of Molecular Sciences 20.4 (2019): 916), substitution of the amino acids P146 and/or N275 has not been described in the prior art. A Capsella rubella peroxidase is disclosed in UniProt entry R0FP47. A predicted peroxidase-like protein from Camelina sativa is disclosed in NCBI protein entry XP_010503561.

The sequence of wild-type HRP is known in the art, e.g. from Gajhede et al ("Crystal structure of horseradish peroxidase C at 2.15 Å resolution." Nature Structural Biology 4.12 (1997): 1032-1038, Protein Data Bank PDB ID 1ATJ) or from UniProt entry P00433. Unless specified otherwise, the residue numbering as used herein refers to the sequence of wild-type HRP as set forth in SEQ ID NO: 1 (the positions P146 and N275 are indicated below in bold).

```
Wild-type HRP (SEQ ID NO: 1):
 0 QLTPTFYDNS CPNVSNIVRD TIVNELRSDP RIAASILRLH FHDCFVNGCD ASILLDNTTS

60 FRTEKDAFGN ANSARGFPVI DRMKAAVESA CPRTVSCADL LTIAAQQSVT LAGGPSWRVP
```

```
120 LGRRDSLQAF LDLANANLPA PFFTLPQLKD SFRNVGLNRS SDLVALSGGH TFGKNQCRFI

180 MDRLYNFSNT GLPDPTLNTT YLQTLRGLCP LNGNLSALVD FDLRTPTIFD NKYYVNLEEQ

240 KGLIQSDQEL FSSPNATDTI PLVRSFANST QTFFNAFVEA MDRMGNITPL TGTQGQIRLN

300 CRVVNS
```

The plant-derived enzyme undergoes post-translational modifications, resulting inter alia in a free N-terminus without an appended methionine. However, when recombinantly produced, e.g. in *E. coli*, it will typically be produced with an N-terminal methionine residue resulting from the start codon. Recombinantly produced wild-type HRP therefore typically has the following sequence:

```
Recombinantly produced wild-type HRP (SEQ ID NO: 2):
  0 MQLTPTFYDN SCPNVSNIVR DTIVNELRSD PRIAASILRL HFHDCFVNGC DASILLDNTT

60 SFRTEKDAFG NANSARGFPV IDRMKAAVES ACPRTVSCAD LLTIAAQQSV TLAGGPSWRV

120 PLGRRDSLQA FLDLANANLP APFFTLPQLK DSFRNVGLNR SSDLVALSGG HTFGKNQCRE

180 IMDRLYNFSN TGLPDPTLNT TYLQTLRGLC PLNGNLSALV DEDLRTPTIF DNKYYVNLEE

240 QKGLIQSDQE LFSSPNATDT IPLVRSFANS TQTFFNAFVE AMDRMGNITP LTGTQGQIRL

300 NCRVVNS
```

It is preferred that the polypeptide according to the invention comprises an amino acid sequence comprising at least two amino acid exchanges compared to SEQ ID NO: 1, wherein said at least two amino acid exchanges are exchanges of the amino acids P146 and N275 of SEQ ID NO: 1. As can be seen from the experimental results provided by Example 2, the combination of amino acid exchanges of both P146 and N275 (in HRP N13D/N57S/P146Q/N175S/N255D/N268D/N275K) can lead to an unexpectedly higher thermostability than the exchange of only one position (HRP N13D/N57S/P146Q/N175S/N255D/N268D or HRP N13D/N57S/N175S/N255D/N268D/N275K).

In the context of the present invention, it is especially preferred if the amino acid sequence comprises at least one amino acid exchange compared to SEQ ID NO: 1, wherein said at least one amino acid exchange is selected from the group consisting of P146Q, P146A, P146R, P146V, P146E, N275K, N275R, N275D, N275S, N275Q, N275A and N275E. P146Q and N275K are in particular preferred.

In the context of all embodiments of the invention, it is preferred if the amino acid sequence of the polypeptide according to the invention comprises an amino acid exchange selected from the group consisting of P146Q, P146A, P146R, P146V and P146E, especially P146Q, compared to SEQ ID NO: 1. It is further preferred if the amino acid sequence comprises an amino acid exchange selected from the group consisting of N275K, N275R, N275D, N275S, N275Q, N275A and N275E, preferably N275K, compared to SEQ ID NO: 1. It is most preferred, if one of the preferred amino acid exchanges for P146 (especially P146Q) and one of the preferred amino acid exchanges for N275 (especially N275K) are combined. As can be seen from the experimental results provided in Examples 2 and 3, such combination can lead to both high thermostability (in HRP N13D/N57S/P146Q/N175S/N255D/N268D/N275 when compared to HRP N13D/N57S/P146Q/N175S/N255D/N268D or HRP N13D/N57S/N175S/N255D/N268D/N275K) and high enzymatic activity (in HRP N13D/N57S/P146Q/N175S/N255D/N268D/N275 when compared to HRP N13D/N57S/N175S/N255D/N268D).

In the context of the present invention, particularly favorable results were observed when the polypeptide comprises an amino acid sequence as set forth in SEQ ID NO: 3. Said sequence comprises the amino acid exchanges P146Q and N275K, as well as the amino acid exchanges N13D, N57S, N175S, N255D and N268D with respect to SEQ ID NO: 1 (all marked in bold below).

```
HRP N13D/N57S/P146Q/N175S/N255D/N268D/N275K (SEQ ID NO: 3):
  0 QLTPTFYDNS CPDVSNIVRD TIVNELRSDP RIAASILRLH FHDCFVNGCD ASILLDSTTS

60 FRTEKDAFGN ANSARGFPVI DRMKAAVESA CPRTVSCADL LTIAAQQSVT LAGGPSWRVP

120 LGRRDSLQAF LDLANANLPA PFFTLQQLKD SERNVGLNRS SDLVALSGGH TFGKSQCRFI

180 MDRLYNFSNT GLPDPTLNTT YLQTLRGLCP LNGNLSALVD FDLRTPTIFD NKYYVNLEEQ

240 KGLIQSDQEL FSSPDATDTI PLVRSFADST QTFFKAFVEA MDRMGNITPL TGTQGQIRLN

300 CRVVNS
```

As noted above for wild-type HRP, when recombinantly produced, e.g. in *E. coli*, mutant HRP will typically be produced with an N-terminal methionine residue resulting from the start codon. The HRP mutant described above will therefore typically be recombinantly produced as a protein with the following sequence:

Recombinantly produced HRP N13D/N57S/P146Q/N175S/N255D/
N268D/N275K (SEQ ID NO: 4):

```
  0 MQLTPTFYDN SCPDVSNIVR DTIVNELRSD PRIAASILRL HFHDCFVNGC DASILLDSTT

60 SFRTEKDAFG NANSARGFPV IDRMKAAVES ACPRTVSCAD LLTIAAQQSV TLAGGPSWRV

120 PLGRRDSLQA FLDLANANLP APFFTLQQLK DSFRNVGLNR SSDLVALSGG HTFGKSQCRF

180 IMDRLYNFSN TGLPDPTLNT TYLQTLRGLC PLNGNLSALV DEDLRTPTIF DNKYYVNLEE

240 QKGLIQSDQE LFSSPDATDT IPLVRSFADS TQTFFKAFVE AMDRMGNITP LTGTQGQIRL

300 NCRVVNS
```

As mentioned above, typically the mutants according to the present invention comprise the N-terminal methionine. However, in some embodiments of the present invention, the mutants do not comprise this N-terminal methionine. In all cases, the amino acid numbering used according to the present invention is applied according to the wild-type sequence lacking the N-terminal methionine (SEQ ID NO: 1); i.e. this numbering is applied to mutants comprising an N-terminal methionine correspondingly, meaning that e.g. in SEQ ID NO: 4 mutation N13D is at (absolute) position no. 14, etc. This is applicable also to further mutant embodiments which carry deletions or insertions.

In a preferred embodiment, the polypeptide comprises an amino acid sequence, which has at least 75%, preferably at least 80%, more preferably at least 85%, even more preferably at least 90%, yet even more preferably at least 95%, especially at least 98%, most preferably at least 99% sequence identity to SEQ ID NO: 3. In order of increasing preference, the amino acid sequence has at least 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100% sequence identity with SEQ ID NO: 3. It is especially preferred, if the amino acid sequence is the sequence as set forth in SEQ ID NO: 3. It is especially preferred that the polypeptide according to the invention consists of the amino acid sequence as set forth in SEQ ID NO: 3. It is further preferred if the polypeptide according to the invention consists of the amino acid sequence as set forth in SEQ ID NO: 4, in particular when said polypeptide is recombinantly produced, e.g. in *E. coli*.

It is further preferred, if the amino acid sequence further comprises at least one, preferably at least two, more preferably at least three, even more preferably at least four, especially 5 amino acid exchanges compared to SEQ ID No: 1 selected from the group consisting of N13D, N57S, N175S, N255D, and N268D.

The mutations N13D, N57S, N255D and N268D have been disclosed in Capone et al. ("Glyco-variant library of the versatile enzyme horseradish peroxidase." Glycobiology 24.9 (2014): 852-863) as well as in Humer and Spadiut ("Improving the performance of horseradish peroxidase by site-directed mutagenesis." International Journal of Molecular Sciences 20.4 (2019): 916). Unrelated thereto, and only in the context of expression in yeast, the mutation N175S has been disclosed in Morawski et al. ("Functional expression and stabilization of horseradish peroxidase by directed evolution in *Saccharomyces cerevisiae*." Biotechnology and Bioengineering 76.2 (2001): 99-107).

All the above mutations N13D, N57S, P146Q, N175S, N255D, N268D and N275K with respect to SEQ ID NO: 1 are preferred in the context of the invention; both individually and in combination with each other. It was surprisingly found that the combination of the five mutations N13D, N57S, N175S, N255D and N268D leads to a particularly high thermostability (see Example 2). Moreover, further combination with the hitherto completely unknown mutations P146Q and N275K led to a significant enhancement of enzymatic activity (see Example 3; SEQ ID NO: 4).

Several further mutations of native HRP are known in the art, which are also preferred in the context of the present invention. For instance, Ryan et al. ("Effects of single mutations on the stability of horseradish peroxidase to hydrogen peroxide." Biochimie 89.8 (2007): 1029-1032) describe beneficial effects of the mutations K232N and T110V. In a preferred embodiment, the amino acid sequence therefore further comprises the amino acid exchange T110V or K 232N compared to SEQ ID NO: 1.

In the context of the present invention, "peroxidase activity" preferably means activity for at least one of the substrates 3,3',5,5'-tetramethylbenzidine (TMB), 2,2'-azino-bis (3-ethylbenzthiazoline-6-sulfonic acid) (ABTS), or hydrogen peroxide ($H_2O_2$). Preferably, the polypeptide according to the invention has a peroxidase activity corresponding to a kcat/Km value for the substrate TMB of at least 0.01 $mM^{-1}s^{-1}$, preferably at least 0.1 $mM^{-1}s^{-1}$, more preferably at least 1 $mM^{-1}s^{-1}$, even more preferably at least 10 $mM^{-1}s^{-1}$, even more preferably at least 20 $mM^{-1}s^{-1}$, even more preferably at least 100 $mM^{-1}s^{-1}$, yet even more preferably at least 1000 $mM^{-1}s^{-1}$, yet even more preferably at least 10000 $mM^{-1}s^{-1}$, especially at least 20000 $mM^{-1}s^{-1}$, when measured in 50 mM phosphate-citrate buffer containing 1 mM $H_2O_2$ at pH 5 and 30° C. In another preferred embodiment, the polypeptide has a peroxidase activity corresponding to a kcat/Km value for the substrate ABTS of at least 0.1 $mM^{-1}s^{-1}$, preferably at least 1 $mM^{-1}s^{-1}$, more preferably at least 10 $mM^{-1}s^{-1}$, even more preferably at least 100 $mM^{-1}s^{-1}$, most preferably at least 250 $mM^{-1}s^{-1}$ when measured in 50 mM phosphate-citrate buffer containing 1 mM $H_2O_2$ at pH 5 and 30° C. In yet another preferred embodiment, the polypeptide has a peroxidase activity corresponding to a kcat/Km value for the substrate $H_2O_2$ of at least 1 $mM^{-1}s^{-1}$, preferably at least 10 $mM^{-1}s^{-1}$, more preferably at least 100 $mM^{-1}s^{-1}$, even more preferably at least 1000 $mM^{-1}s^{-1}$, most preferably at least 2500 $mM^{-1}s^{-1}$ when measured in 50 mM phosphate-citrate buffer containing 10 mM ABTS at pH 5 and 30° C. Preferably, the peroxidase activity is measured as described in Example 1. 50 mM phosphate-citrate buffer can be obtained by adding 25.7 ml of 0.2 M dibasic sodium phosphate and 24.3 ml of 0.1 M citric acid to 50 mL of deionized water.

It is preferred that the peroxidase activity of the polypeptide according to the invention is at least 10%, preferably at least 20%, more preferably at least 50% of the peroxidase activity of wild-type HRP, in particular of a polypeptide consisting of the amino acid sequence as set forth in SEQ ID NO: 1 or SEQ ID NO: 2, preferably SEQ ID NO: 2, especially when the polypeptides are produced and measured under the same conditions.

In a preferred embodiment, the polypeptide according to the invention has an increased thermostability with respect to wild-type HRP. With respect to the inventive polypeptide comprising an amino acid sequence with a certain % sequence identity to SEQ ID NO: 3, it is preferred if a polypeptide consisting of said amino acid sequence has an increased thermostability with respect to a polypeptide consisting of the amino acid sequence as set forth in SEQ ID NO: 1 or SEQ ID NO: 2, preferably SEQ ID NO: 2. A methionine residue can be appended to the N-terminus of said amino acid sequence with a certain % sequence identity to SEQ ID NO: 3 so that it can be recombinantly produced in *E. coli*; i.e. it is preferred if a polypeptide consisting of an N-terminal methionine residue followed by said amino acid sequence has an increased thermostability with respect to a polypeptide consisting of the amino acid sequence as set forth in SEQ ID NO: 2). In order to compare the thermostability of such two polypeptides, the polypeptides can be produced and measured under the same conditions. "Increased thermostability" preferably means a longer half-life when incubated at 60° C. in a buffer consisting of 20 mM BisTris/HCl pH 7, 7% glycerol and 500 mM NaCl. It is preferred that said half-life of a polypeptide consisting of said amino acid sequence (and/or of the polypeptide according to the invention comprising said amino acid sequence) is at least 1.5-fold, preferably at least 3-fold, more preferably at least 6-fold, even more preferably at least 12-fold higher with respect to the polypeptide consisting of the amino acid sequence as set forth in SEQ ID NO: 1 or SEQ ID NO: 2, preferably SEQ ID NO: 2. Preferably, the half-life is determined by measuring the residual peroxidase activity with 7 mM ABTS in 50 mM phosphate-citrate buffer containing 1 mM $H_2O_2$ at pH 5 and 30° C. at different time points. For measurements of half-lives, it is preferred that the concentration of the polypeptides is 2.86 µM. Preferably, the half-life is determined as described in Example 1.

In a preferred embodiment the polypeptide consisting of said amino acid sequence and/or the inventive polypeptide comprising said amino acid sequence has a half-life at 60° C. of at least 0.5 hours, preferably at least 1 hour, more preferably at least 2 hours, even more preferably at least 4 hours, most preferably at least 6 hours in a buffer consisting of 20 mM BisTris/HCl pH 7, 7% glycerol and 500 mM NaCl, as measured by the residual peroxidase activity with 7 mM ABTS in 50 mM phosphate-citrate buffer containing 1 mM $H_2O_2$ at pH 5 and 30° C.

In many applications, HRP is used as a conjugate with other molecules. Such conjugates are e.g. useful in techniques such as western blots, ELISA and immunohistochemistry. One type of conjugate that is widely used, is a conjugate with an antibody or another binding protein. In this case, a detectable signal can be generated at the site where the binding protein is bound to its target by adding a substrate of HRP. Other HRP conjugates that are frequently used include HRP-streptavidin conjugates (e.g. for use in sandwich ELISA applications for detecting biotinylated antibodies) or HRP-protein A, G or L conjugates (proteins A, G and L bind to immunoglobulins and are thus useful for detecting primary antibodies, e.g. in ELISA, ELISPOT, IHC, or Western blotting).

In a preferred embodiment, the polypeptide according to the invention therefore further comprises an amino acid sequence of streptavidin. In yet another preferred embodiment, the polypeptide further comprises an amino acid sequence of protein A, protein G or protein L.

It is further preferred that the polypeptide according to the invention comprises an amino acid sequence of a binding protein. The inventive polypeptide can therefore be or comprise a conjugate of a mutant HRP and a binding protein. Said binding protein may be any protein that can act as an agent to bind to a molecule of interest, e.g. to detect a specific protein or another molecule. Preferably said binding protein is an antibody. In a further preferred embodiment, said binding protein is an antibody fragment, preferably a single-chain variable fragment (scFv) or an antigen-binding fragment (Fab). In a further preferred embodiment said binding protein is an antibody mimetic, preferably selected from the group consisting of adnectins, affibodies, anticalins, DARPins, engineered Kunitz-type inhibitors, and monobodies. Many such suitable binding proteins are known from the art, e.g. from Gebauer and Skerra ("Engineered protein scaffolds as next-generation antibody therapeutics." Current opinion in chemical biology 13.3 (2009): 245-255).

Conjugates between HRP and a binding protein can be obtained by linking HRP to the binding protein by known methods, e.g. by generating a genetic fusion (joining the nucleic acid sequence encoding the HRP to a nucleic acid sequence encoding the binding protein, preferably with the inclusion of a linker sequence between the two proteins) and expressing the resulting fusion protein in a suitable host, e.g. in *E. coli*. Alternatively, such a conjugate may be obtained by chemical crosslinking. For this purpose, HRP (which is preferably purified) and the binding protein can be linked together by a chemical crosslinker, forming a stable, preferably covalent, link between the two molecules. Such methods, often referred to as bioconjugation, are known in the art. A large number of suitable methods can e.g. be found in the book Hermanson, Greg T. Bioconjugate Techniques. Academic press, 2013. Suitable crosslinkers are also described herein below in relation to the inventive kit.

Conjugates between HRP and other proteins such as streptavidin or protein A, G or L can be obtained by similar methods as described above for conjugates with binding proteins.

Preferably the polypeptide according to the invention can be recombinantly produced by culturing a host cell comprising a suitable expression vector. Preferably the host cell is a yeast (*Saccharomyces, Pichia*) cell or a prokaryotic cell. It is especially preferred if the host cell is a bacterium, most preferably *Escherichia coli* (*E. coli*).

It is preferred that the polypeptide is an isolated polypeptide. The polypeptide may be isolated from cell culture and may be purified and/or concentrated as appropriate for the particular application.

For producing the polypeptide according to the invention, standard methods known in the art may be used. Suitable methods are described, for instance, in Humer and Spadiut ("Improving the performance of horseradish peroxidase by site-directed mutagenesis." International Journal of Molecular Sciences 20.4 (2019): 916). Further suitable methods for producing and purifying the polypeptide are described in Smith et al ("Expression of a synthetic gene for horseradish peroxidase C in *Escherichia coli* and folding and activation of the recombinant enzyme with Ca2+ and heme." Journal of Biological Chemistry 265.22 (1990): 13335-13343) or Gundinger and Spadiut ("A comparative approach to recombinantly produce the plant enzyme horseradish peroxidase in *Escherichia coli*." Journal of Biotechnology 248 (2017): 15-24). Preferably, the polypeptide according to the invention is produced as described in Example 1.

With regards to the composition according to the invention, it is preferred if said composition comprises one or more excipients. Such excipients may, for instance, further increase the stability of the inventive polypeptide in storage, ensure an even longer shelf-life and a stable level of biological activity. Preferred excipients include pH buffering agents, stabilizing agents, bulking agents, tonicity modifiers and the like. Especially preferred are excipients that are suitable for use in the context of lyophilization.

Suitable excipients are known to the person skilled in the art. For example, the composition preferably contains a pH buffering agent, preferably selected from the group consisting of glycine, histidine, glutamate, succinate, phosphate, acetate, and aspartate. It is further preferred that the composition comprises a bulking agent, preferably selected from the group consisting of mannitol, glycine, sucrose, dextran, polyvinylpyrolidone, carboxymethylcellulose, lactose, sorbitol, trehalose, or xylitol. The composition preferably comprises a stabilizing agent selected from the group consisting of sucrose, trehalose, mannose, maltose, lactose, glucose, raffinose, cellobiose, gentiobiose, isomaltose, arabinose, glucosamine, fructose, mannitol, sorbitol, glycine, arginine HCL, poly-hydroxy compounds, including polysaccharides such as dextran, starch, hydroxyethyl starch, cyclodextrins, N-methyl pyrollidene, cellulose and hyaluronic acid, sodium chloride. The composition may further include a surfactant, preferably selected from the group consisting of sodium lauryl sulfate, dioctyl sodium sulfosuccinate, dioctyl sodium sulfonate, chenodeoxycholic acid, N-lauroylsarcosine sodium salt, lithium dodecyl sulfate, 1-octanesulfonic acid sodium salt, sodium cholate hydrate, sodium deoxycholate, glycodeoxycholic acid sodium salt, benzalkonium chloride or benzethonium chloride, cetylpyridinium chloride monohydrate, hexadecyltrimethylammonium bromide, CHAPS, CHAPSO, SB3-10, SB3-12, digitonin, Triton X-100, Triton X-114, lauromacrogol 400, polyoxyl 40 stearate, polyoxyethylene hydrogenated castor oil 10, 40, 50 and 60, glycerol monostearate, polysorbate 20, 40, 60, 65 and 80, soy lecithin, DOPC, DMPG, DMPC, and DOPG; sucrose fatty acid ester, methyl cellulose and carboxymethyl cellulose.

Advantageously, the composition comprises at least 0.01 mg, preferably at least 0.1 mg, more preferably at least 1 mg, even more preferably at least 5 mg, especially at least 10 mg of the polypeptide according to the invention. It is further preferred if the composition contains the inventive polypeptide in a concentration of at least 0.0001% (weight per weight, w/w), preferably at least 0.001% w/w, more preferably at least 0.01% w/w, even more preferably at least 0.1% w/w, yet even more preferably at least 1% w/w, especially at least 10% w/w.

Advantageously the composition is a solid composition (at 25° C. and at atmospheric pressure), preferably a lyophilized composition. In another preferred embodiment, the composition is a liquid composition (at 25° C. and at atmospheric pressure). Advantageously the composition contains the polypeptide according to the invention in a concentration of at least 0.001 mg/mL, preferably at least 0.01 mg/mL, more preferably at least 0.1 mg/mL, yet even more preferably at least 0.5 mg/mL, most preferably at least 2 mg/mL.

It is further preferred that the inventive polypeptide comprised in the inventive composition is isolated from a host, e.g. from a bacterium such as E. coli. In particular, it is preferred that the inventive composition is substantially free of DNA, especially dsDNA. Preferably, the composition contains less than 1 µg/g, preferably less than 100 ng/g, more preferably less than 10 ng/g, most preferably less than 1 ng/g DNA. The DNA concentration can be determined by fluorometry using the dye SYBR Green I (N',N'dimethyl-N-[4-[(E)-(3-methyl-1,3-benzothiazol-2-ylidene)methyl]-1-phenylquinolin-1-ium-2-yl]-N-propylpropane-1,3-diamine). The skilled person is familiar with the measurement of DNA concentrations using fluorometry. The measurement can be performed as described in Rengarajan, Kalpana, et al. ("Technical Brief Quantifying DNA concentrations using fluorometry: A comparison of fluorophores." Molecular Vision 8 (2002): 416-421).

The polypeptide according to the invention may find use in a variety of therapeutic applications, for instance in targeted cancer treatment. In a preferred embodiment, the composition is therefore a pharmaceutical composition, preferably comprising one or more excipients, which are pharmaceutically acceptable for administration to an individual, especially a mammal, in particular a human. Suitable excipients are known to the person skilled in the art, for example water (especially water for injection), saline, Ringer's solution, dextrose solution, buffers, Hank solution, vesicle forming compounds (e.g. lipids), fixed oils, ethyl oleate, 5% dextrose in saline, substances that enhance isotonicity and chemical stability, buffers and preservatives. Other suitable excipients include any compound that does not induce the production of antibodies when administered to a patient that are harmful for the patient. Examples are well tolerable proteins, polysaccharides, polylactic acids, polyglycolic acid, polymeric amino acids and amino acid copolymers. This pharmaceutical composition is preferably suitable for parenteral administration, in particular intravenous administration. The pharmaceutical composition may be provided in injectable dosage unit form, e.g. as a solution, suspension or emulsion, formulated in conjunction with the above-defined pharmaceutically acceptable excipients. All preferred embodiments listed above for the inventive composition in general (in particular related to concentrations and amounts of the polypeptide), are also preferred when the composition is a pharmaceutical composition.

In the context of therapeutic applications, the polypeptide according to the invention may be part of an enzyme-prodrug system. Enzyme-prodrug systems comprising HRP are known in the art, in particular for the treatment of cancer (see e.g. Tupper et al. "In vivo characterization of horseradish peroxidase with indole-3-acetic acid and 5-bromoindole-3-acetic acid for gene therapy of cancer." Cancer Gene Therapy 17.6 (2010): 420-428). For instance, targeted cancer treatment may involve an enzyme-prodrug system that comprises HRP together with Indole acetic acid (IAA), wherein HRP oxidizes Indole acetic acid (IAA), which then decreases the viability of carcinoma cells. Neither the prodrug IAA nor HRP alone are cytotoxic, showing the necessity of combining these two substances in a pure and for the human being reconcilable and nonimmunogenic form to obtain the desired cytotoxic effect. In another study it was shown that HRP can convert paracetamol into a powerful cytotoxin (Tupper et al. "Use of horseradish peroxidase for gene-directed enzyme prodrug therapy with paracetamol." British Journal of Cancer 90.9 (2004): 1858-1862). However, the authors found that the commercially available HRP preparation from plant was not very effective in that conversion reaction and thus did not pursue this study further. The polypeptide according to the invention may in particular find use in antibody directed enzyme prodrug therapy (ADEPT; see e.g. Bagshawe "Antibody-directed enzyme prodrug therapy (ADEPT) for cancer." Expert Review of Anticancer Therapy 6.10 (2006): 1421-1431). The principle of ADEPT is typically to use an antibody directed at a tumor-associated antigen to localize an enzyme (such as e.g. HRP)

to tumor sites. A prodrug can be given to the patient which is then converted into its activated species location-specifically.

The nucleic acid molecule according to the invention may also find use in therapy, in particular in gene therapy such as gene-directed enzyme prodrug therapy (GDEPT) or ADEPT.

For many applications, in particular industrial applications such as waste-water treatment (e.g. removal of chlorophenols), it is advantageous if the polypeptide according to the invention is immobilized on a solid carrier. It is therefore preferred that the polypeptide comprised in the composition according to the invention is immobilized on a solid carrier. Among other advantages, enzyme immobilization allows a particularly high storage stability, enhanced reusability, reduction of the operational process cost, etc. HRP immobilized on solid carriers and its industrial applications are known in the art, see e.g. Tatsumi, et al. ("Removal of chlorophenols from wastewater by immobilized horseradish peroxidase." Biotechnology and Bioengineering 51.1 (1996): 126-130) and Sarno and Iuliano ("Immobilization of Horseradish Peroxidase on $Fe_3O_4$/Au_GO Nanoparticles to Remove 4-chlorophenols from Waste Water." Chemical Engineering Transactions 73 (2019): 217-222). The skilled person is familiar with methods for immobilizing enzymes on solid carriers, e.g. as described in Andreescu, et al. ("Chapter 7—Nanostructured materials for enzyme immobilization and biosensors." The New Frontiers of Organic and Composite Nanotechnology. Elsevier, 2008, 355-394).

Nanomaterials are particularly suitable as solid carriers because of their specific surface area and effective enzyme loading. In the context of this embodiment, it is therefore preferred if the solid carrier is a nanoparticle. A "nanoparticle" as used herein preferably is a particle of any shape with all three dimensions in the $1 \times 10^{-12}$ to $1 \times 10^{-6}$ m range, even more preferably in the $1 \times 10^{-9}$ to $1 \times 10^{-7}$ m range. The nanoparticle may e.g. be a magnetite ($Fe_3O_4$) nanoparticle or a gold nanoparticle. Especially preferred are magnetic nanoparticles, since they offer the additional advantage of easy separation by applying a magnetic field. Further preferred examples of solid carriers are nanofibers, carbon/polyvinyl materials, carbon nanotubes, nanowires, nanorods, nanocrystals, mesoporous silica and composite materials.

In a further preferred embodiment the solid carrier is a membrane, in particular a synthetic membrane such as polymeric membrane. Membranes comprising immobilized HRP, methods of producing such membranes as well as applications of such membranes (e.g. in waste water treatment) are known in the art, e.g. from Vasileva et al. ("Application of immobilized horseradish peroxidase onto modified acrylonitrile copolymer membrane in removing of phenol from water." International journal of biological macromolecules 44.2 (2009): 190-194).

With respect to the kit according to the invention, it is preferred if the polypeptide is provided in lyophilized form. In an alternative preferred embodiment, the polypeptide is provided in solution.

The kit according to the invention preferably comprises components selected from buffers, reagents, and instructions manuals.

In a preferred embodiment, the kit according to the invention further comprises a crosslinker suitable for conjugating the polypeptide to another molecule. Preferably said crosslinker is suitable for conjugating the polypeptide to another protein, preferably a binding protein. Kits for conjugating HRP to proteins of interest are known in the art and are available from many commercial suppliers; e.g. HRP Conjugation Kit/HRP Labeling Kit ab102890 from the company Abcam, LYNX Rapid HRP Antibody Conjugation Kit from the company Bio-Rad (product code LNK001P), or EZ-Link Plus Activated Peroxidase Kit from the company Thermo Fisher Scientific (catalogue number 31489). The purpose of such kits is typically to enable the user to conjugate HRP to any protein of interest, e.g. an antibody. Such kits may comprise HRP in activated form (for direct reaction with another protein) or the kit may comprise HRP and a suitable crosslinker for conjugation by the user.

Suitable techniques for conjugation and suitable crosslinkers can e.g. be found in the book Hermanson, Greg T. Bioconjugate Techniques. Academic press, 2013. Preferably, the crosslinker suitable for conjugating the polypeptide to another molecule is capable of forming a covalent bond with the polypeptide. Preferably, the crosslinker comprises one, especially two reactive groups selected from the group consisting of NHS ester, succinimidyl ester, imidoester, difluoro, haloacetyl, maleimide, pyridyldithiol and hydrazide. For instance, the crosslinker may be a bifunctional PEG linker having a maleimide group and an active ester group, e.g. Maleimide-$PEG_8$-succinimidyl ester (CAS Number 756525-93-6, e.g. commercially available from Sigma-Aldrich cat. no. 746207).

In a further preferred embodiment, the polypeptide according to the invention is activated for conjugation. This embodiment is especially preferred in the context of the kit comprising the polypeptide according to the invention. Preferably, "activated for conjugation" means that the polypeptide comprises a reactive group that is capable of forming a covalent bond with another protein, preferably with a binding protein, especially with an antibody. It is in particular preferred that the polypeptide is covalently linked to a chemical crosslinker as described above, in particular wherein at least one reactive group of the crosslinker is available for reaction with another molecule, preferably another protein. This can e.g. be achieved by reacting a further reactive group of the crosslinker with the polypeptide according to the invention in order to form the covalent link.

The polypeptide according to the invention may further find use as a reactant for coupled enzyme assays. In such assays, an enzyme of interest (e.g. glucose oxidase) produces $H_2O_2$ which then can be utilized by HRP (see e.g. Aumiller et al. "Coupled enzyme reactions performed in heterogeneous reaction media: experiments and modeling for glucose oxidase and horseradish peroxidase in a PEG/citrate aqueous two-phase system." The Journal of Physical Chemistry B 118.9 (2014): 2506-2517).

The polypeptide according to the invention may be further used as a reactant for polymer crosslinking. For instance, HRP has successfully been used in the art for the enzymatic crosslinking of dextran-tyramine conjugates for the preparation of hydrogels, e.g. as 3D scaffolds for cartilage tissue engineering applications. (Jin et al. "Enzymatically crosslinked dextran-tyramine hydrogels as injectable scaffolds for cartilage tissue engineering." Tissue Engineering Part A 16.8 (2010): 2429-2440).

To facilitate the understanding of the invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims. "Percent (%) amino acid sequence identity", "X % sequence identity" or "X % identical" (such as "70% sequence identity" or "70% identical") with respect to a reference polypeptide or protein sequence is defined as the percentage of amino acid residues in a candidate sequence that are identical with the amino acid residues in the reference polypeptide sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN, ALIGN-2, Megalign (DNASTAR) or the "needle" pairwise sequence alignment application of the EMBOSS software package. Those skilled in the art can determine appropriate parameters for aligning sequences, including any algorithms needed to achieve maximal alignment over the full length of the sequences being compared. For purposes herein, however, % amino acid sequence identity values are calculated using the sequence alignment of the computer programme "needle" of the EMBOSS software package (publicly available from European Molecular Biology Laboratory; Rice et al., EMBOSS: the European Molecular Biology Open Software Suite, Trends Genet. 2000 June; 16(6):276-7, PMID: 10827456).

The needle programme can be accessed under the web site http://www.ebi.ac.uk/Tools/psa/emboss_needle/ or downloaded for local installation as part of the EMBOSS package from http://emboss.sourceforge.net/. It runs on many widely-used UNIX operating systems, such as Linux.

To align two protein sequences, the needle programme is preferably run with the following parameters:
Commandline: needle -auto -stdout -asequence SEQUENCE_FILE_A -bsequence SEQUENCE_FILE_B -datafile EBLOSUM62 -gapopen 10.0 -gapextend 0.5 -endopen 10.0 -endextend 0.5 -aformat3 pair -sprotein1 -sprotein2 (Align_format: pair Report_file: stdout)

The % amino acid sequence identity of a given amino acid sequence A to, with, or against a given amino acid sequence B (which can alternatively be phrased as a given amino acid sequence A that has or comprises a certain % amino acid sequence identity to, with, or against a given amino acid sequence B) is calculated as follows:

100 times the fraction X/Y, where X is the number of amino acid residues scored as identical matches by the sequence alignment program needle in that program's alignment of A and B, and where Y is the total number of amino acid residues in B. It will be appreciated that where the length of amino acid sequence A is not equal to the length of amino acid sequence B, the % amino acid sequence identity of A to B will not equal the % amino acid sequence identity of B to A. In cases where "the sequence of A is more than N % identical to the entire sequence of B", Y is the entire sequence length of B (i.e. the entire number of amino acid residues in B). Unless specifically stated otherwise, all % amino acid sequence identity values used herein are obtained as described in the immediately preceding paragraph using the needle computer program.

Unless specified otherwise, all parameters as used herein correspond to parameters at IUPAC SATP-conditions ("Standard Ambient Temperature and Pressure"), in particular a temperature of 25° C. and a pressure of 101.300 Pa.

Percentages (%) as used herein correspond to weight per volume (w/v) unless specified as weight per weight (w/w) or otherwise.

The present invention relates to the following preferred embodiments:

Embodiment 1. A polypeptide having peroxidase activity and comprising an amino acid sequence having at least 70% sequence identity to SEQ ID NO: 3, wherein said amino acid sequence comprises at least one amino acid exchange compared to SEQ ID NO: 1, wherein said at least one amino acid exchange is an exchange of the amino acid P146 or of the amino acid N275 of SEQ ID NO: 1.

Embodiment 2. A polypeptide having peroxidase activity and comprising an amino acid sequence having at least 70% sequence identity to SEQ ID NO: 3, wherein said amino acid sequence comprises at least two amino acid exchanges compared to SEQ ID NO: 1, wherein said at least two amino acid exchanges are exchanges of the amino acids P146 and N275 of SEQ ID NO: 1.

Embodiment 3. A polypeptide having peroxidase activity and comprising an amino acid sequence having at least 70% sequence identity to SEQ ID NO: 3, wherein said amino acid sequence comprises at least one amino acid exchange compared to SEQ ID NO: 1, wherein said at least one amino acid exchange is selected from the group consisting of P146Q, P146A, P146R, P146V, P146E, N275K, N275R, N275D, N275S, N275Q, N275A and N275E; preferably P146Q or N275K.

Embodiment 4. The polypeptide according to any one of embodiments 1 to 3, wherein said amino acid sequence comprises an amino acid exchange selected from the group consisting of P146Q, P146A, P146R, P146V and P146E, preferably P146Q, compared to SEQ ID NO: 1.

Embodiment 5. The polypeptide according to any one of embodiments 1 to 4, wherein said amino acid sequence comprises an amino acid exchange selected from the group consisting of N275K, N275R, N275D, N275S, N275Q, N275A and N275E, preferably N275K, compared to SEQ ID NO: 1.

Embodiment 6. The polypeptide according to any one of embodiments 1 to 5, wherein said amino acid sequence comprises the amino acid exchanges P146Q and N275K compared to SEQ ID NO: 1.

Embodiment 7. A polypeptide having peroxidase activity and comprising an amino acid sequence having at least 70% sequence identity to SEQ ID NO: 3, wherein the amino acid sequence comprises at least
  one amino acid exchange compared to SEQ ID NO: 1 selected from the group consisting of P146Q, P146A, P146R, P146V and P146E, preferably P146Q; and
  a further amino acid exchange compared to SEQ ID NO: 1 selected from the group consisting of N275K, N275R, N275D, N275S, N275Q, N275A and N275E, preferably N275K.

Embodiment 8. The polypeptide according to any one of embodiments 1 to 7, wherein said amino acid sequence has at least 75%, preferably at least 80%, more preferably at least 85%, even more preferably at least 90%, yet even more preferably at least 95%, especially at least 98%, yet even more preferably at least 99% sequence identity to SEQ ID NO: 3, most preferably wherein said amino acid sequence is the sequence as set forth in SEQ ID NO: 3.

Embodiment 9. The polypeptide according to any one of embodiments 1 to 8, wherein said amino acid sequence is the sequence as set forth in SEQ ID NO: 4.

Embodiment 10. The polypeptide according to any one of embodiments 1 to 9, wherein said amino acid sequence further comprises at least one, preferably at least two, more preferably at least three, even more preferably at least four, especially 5 amino acid exchanges compared to SEQ ID No: 1 selected from the group consisting of N13D, N57S, N175S, N255D, and N268D.

Embodiment 11. The polypeptide according to any one of embodiments 1 to 10, wherein said amino acid sequence further comprises the amino acid exchange N13D compared to SEQ ID NO: 1.

Embodiment 12. The polypeptide according to any one of embodiments 1 to 11, wherein said amino acid sequence further comprises the amino acid exchange N57S compared to SEQ ID NO: 1.

Embodiment 13. The polypeptide according to any one of embodiments 1 to 12, wherein said amino acid sequence further comprises the amino acid exchange N175S compared to SEQ ID NO: 1.

Embodiment 14. The polypeptide according to any one of embodiments 1 to 13, wherein said amino acid sequence further comprises the amino acid exchange N255D compared to SEQ ID NO: 1.

Embodiment 15. The polypeptide according to any one of embodiments 1 to 14, wherein said amino acid sequence further comprises the amino acid exchange N268S compared to SEQ ID NO: 1.

Embodiment 16. The polypeptide according to any one of embodiments 1 to 15, wherein said amino acid sequence further comprises the amino acid exchange T110V or K232N compared to SEQ ID NO: 1.

Embodiment 17. The polypeptide according to any one of embodiments 1 to 16, wherein the peroxidase activity corresponds to a kcat/Km value for the substrate 3,3',5,5'-tetramethylbenzidine (TMB) of at least 0.01 $mM^{-1}s^{-1}$, preferably at least 0.1 $mM^{-1}s^{-1}$, more preferably at least 1 $mM^{-1}s^{-1}$, even more preferably at least 10 $mM^{-1}s^{-1}$, even more preferably at least 20 $mM^{-1}s^{-1}$, even more preferably at least 100 $mM^{-1}s^{-1}$, yet even more preferably at least 1000 $mM^{-1}s^{-1}$, yet even more preferably at least 10000 $mM^{-1}s^{-1}$, especially at least 20000 $mM^{-1}s^{-1}$, when measured in 50 mM phosphate-citrate buffer containing 1 mM $H_2O_2$ at pH 5 and 30° C.

Embodiment 18. The polypeptide according to any one of embodiments 1 to 17, wherein the peroxidase activity corresponds to a kcat/Km value for the substrate 2,2'-azino-bis (3-ethylbenzthiazoline-6-sulfonic acid) (ABTS) of at least 0.1 $mM^{-1}s^{-1}$, preferably at least 1 $mM^{-1}s^{-1}$, more preferably at least 10 $mM^{-1}s^{-1}$, even more preferably at least 100 $mM^{-1}s^{-1}$, most preferably at least 250 $mM^{-1}s^{-1}$ when measured in 50 mM phosphate-citrate buffer containing 1 mM $H_2O_2$ at pH 5 and 30° C.

Embodiment 19. The polypeptide according to any one of embodiments 1 to 18, wherein the peroxidase activity corresponds to a kcat/Km value for the substrate hydrogen peroxide ($H_2O_2$) of at least 1 $mM^{-1}s^{-1}$, preferably at least 10 $mM^{-1}s^{-1}$, more preferably at least 100 $mM^{-1}s^{-1}$, even more preferably at least 1000 $mM^{-1}s^{-1}$, most preferably at least 2500 $mM^{-1}s^{-1}$ when measured in 50 mM phosphate-citrate buffer containing 10 mM ABTS at pH 5 and 30° C.

Embodiment 20. The polypeptide according to any one of embodiments 1 to 19, wherein a polypeptide consisting of said amino acid sequence has an increased thermostability with respect to a polypeptide consisting of the amino acid sequence as set forth in SEQ ID NO: 1 or SEQ ID NO: 2, preferably SEQ ID NO: 2.

Embodiment 21. The polypeptide according to any one of embodiments 1 to 20, wherein a polypeptide consisting of said amino acid sequence has a half-life at 60° C. of at least 0.5 hours, preferably at least 1 hour, more preferably at least 2 hours, even more preferably at least 4 hours, most preferably at least 6 hours in a buffer consisting of 20 mM BisTris/HCl pH 7, 7% glycerol and 500 mM NaCl, as measured by the residual peroxidase activity with 7 mM ABTS in 50 mM phosphate-citrate buffer containing 1 mM $H_2O_2$ at pH 5 and 30° C.

Embodiment 22. The polypeptide according to any one of embodiments 1 to 21, wherein a polypeptide consisting of said amino acid sequence has a longer half-life at 60° C. with respect to a polypeptide consisting of the amino acid sequence as set forth in SEQ ID NO: 1 or SEQ ID NO: 2, preferably SEQ ID NO: 2, in a buffer consisting of 20 mM BisTris/HCl pH 7, 7% glycerol and 500 mM NaCl, as measured by the residual peroxidase activity with 7 mM ABTS in 50 mM phosphate-citrate buffer containing 1 mM $H_2O_2$ at pH 5 and 30° C.

Embodiment 23. The polypeptide according to embodiment 22, wherein said half-life at 60° C. is at least 1.5-fold, preferably at least 3-fold, more preferably at least 6-fold, even more preferably at least 12-fold higher with respect to a polypeptide consisting of the amino acid sequence as set forth in SEQ ID NO: 1 or SEQ ID NO: 2, preferably SEQ ID NO: 2.

Embodiment 24. The polypeptide according to any one of embodiments 1 to 23, wherein the polypeptide further comprises an amino acid sequence of a binding protein, preferably an amino acid sequence of an antibody.

Embodiment 25. The polypeptide according to any one of embodiments 1 to 24, wherein the polypeptide further comprises an amino acid sequence of streptavidin.

Embodiment 26. The polypeptide according to any one of embodiments 1 to 25, wherein the polypeptide further comprises an amino acid sequence of protein A, protein G or protein L.

Embodiment 27. A nucleic acid molecule comprising a sequence encoding the polypeptide according to any one of embodiments 1 to 26.

Embodiment 28. An expression vector comprising the nucleic acid molecule according to embodiment 27.

Embodiment 29. A host cell comprising the expression vector according to embodiment 28.

Embodiment 30. The host cell according to embodiment 29, wherein the host cell is a bacterium, preferably E. coli.

Embodiment 31. A method for producing the polypeptide according to any one of embodiments 1 to 26 comprising the steps of culturing the host cell according to embodiment 30 and recovering said polypeptide.

Embodiment 32. A composition comprising the polypeptide according to any one of embodiments 1 to 26.

Embodiment 33. The composition according to embodiment 32, further comprising one or more excipients.

Embodiment 34. The composition according to embodiment 32 or 33, wherein the composition comprises at least 0.01 mg, preferably at least 0.1 mg, more preferably at least 1 mg, even more preferably at least 5 mg, especially at least 10 mg of said polypeptide.

Embodiment 35. The composition according to any one of embodiments 32 to 34, wherein the composition contains said polypeptide in a concentration of at least 0.0001% w/w, preferably at least 0.001% w/w, more preferably at least 0.01% w/w, even more preferably at least 0.1% w/w, yet even more preferably at least 1% w/w, especially at least 10% w/w.

Embodiment 36. The composition according to any one of embodiments 32 to 35, wherein the composition is a pharmaceutical composition, preferably comprising a pharmaceutically acceptable excipient.

Embodiment 37. The composition according to any one of embodiments 32 to 36, wherein the polypeptide is immobilized on a solid carrier, preferably a nanoparticle.

Embodiment 38. A kit comprising the polypeptide of any one of embodiments 1 to 26 or the composition according to any one of embodiments 32 to 37.

Embodiment 39. The kit according to embodiment 38, wherein the polypeptide is provided in lyophilized form.

Embodiment 40. The kit according to embodiment 38 or 39, wherein the polypeptide is provided in solution.

Embodiment 41. The kit according to any one of embodiments 38 to 40, further comprising a crosslinker suitable for conjugating the polypeptide to another protein.

Embodiment 42. The kit according to any one of embodiments 38 to 41, wherein the kit further comprises components selected from buffers, reagents, and instructions manuals.

The present invention is further illustrated by the following figures and examples, without being limited thereto.

FIG. 1. Residual activities of HRP N13D/N57S/P146Q/N175S/N255D/N268D/N275K (mHRP, SEQ ID NO: 4) compared to recombinant wild-type HRP (rHRP, SEQ ID NO: 2) and plant-derived HRP (pHRP). 150 µl of pHRP (triangles), mHRP (squares) and rHRP (circles) with a concentration of 2.86 µM were incubated in 50 mM BisTris/HCl pH 7, 0.5 M NaCl, 7% glycerol for up to 10 h at 60° C. Initial and residual enzyme activities were measured with ABTS as described in Example 1 and are plotted in % against the incubation time. mHRP displayed a more than 13-fold enhanced thermostability over rHRP and a 1.7-fold enhanced thermostability even over the plant-derived (i.e. glycosylated) pHRP.

EXAMPLE 1. MATERIALS AND METHODS

Expression and Purification of HRP Mutants

Plant HRP Type VI-A (Cat. No.: P6782) was obtained from Sigma-Aldrich (St. Louis, MO, USA). All HRP variants produced in *E. coli* consisted of the sequence as set forth in SEQ ID NO: 2 with the indicated mutations unless specified otherwise.

Expression Host and Plasmids

Standard molecular cloning techniques were performed as described previously (Humer and Spadiut. "Improving the performance of horseradish peroxidase by site-directed mutagenesis." International Journal of Molecular Sciences 20.4 (2019): 916). The hrp gene coding for HRP variant C1A (wild-type HRP; SEQ ID NO: 2) was codon-optimized for *E. coli* and obtained from GenSript USA Inc. (Piscataway, NJ, USA). HRP was produced from pSF-T7-LacO-NH2-dsbA (OG4591) (Oxford Genetics Ltd., Oxford, UK) or pET21d+ (Novagen, San Diego, CA, USA) in the *E. coli* strain BL21 (DE3) (Lucigen, Middleton, WI, USA). The plasmid pSFT7 encodes a Dsb tag for export into the periplasm which is cleaved off after translocation. The plasmid pET21d+ was used for HRP inclusion body production in the cytoplasm. A stop codon was introduced so that the protein is produced without any tags.

Protein Expression and Purification from Inclusion Bodies (IBs)

SB medium (32 g L$^{-1}$ tryptone; 20 g L$^{-1}$ yeast extract; 5 g L$^{-1}$ NaCl; 5 mM NaOH) was used for cultivation of BL21 (DE3) cells that comprised vector pET21d+ with the hrp gene (or variants thereof) devoid of any N- or C-terminal tags. Ampicillin was added to a final concentration of 100 mg L-1. Pre-cultures were grown overnight at 37° C. with shaking (250 rpm) in 50 mL SB$^{Amp}$ medium and 2.5 L Ultra Yield Flasks (UYF) were inoculated to reach an optical density (OD$_{600}$) of 0.3 in a final volume of 500 mL SB$^{Amp}$ medium. The cells were grown at 37° C. with shaking (250 rpm) until an OD$_{600}$ of 0.5, subsequently hrp expression was induced by adding 0.1 mM isopropyl β-D-1-thiogalactopyranoside (IPTG). After growth for 20 h at 25° C. and 250 rpm, the cells were harvested by centrifugation (5000 g, 20 min, 4° C.).

Biomass was resuspended using an IKA T10 basic ULTRA-TURRAX in 3-5 mL buffer A/g wet biomass (Buffer A: 50 mM TRIS/HCl; pH 8; 500 mM NaCl; 1.5 mM EDTA) and homogenized (using a GEA Niro Soavi Panda PLUS) (>1300 bar, 3 passages, cooled). The homogenized suspension was centrifuged (15650 g; 20 min, 4° C.), the supernatant discarded and the cell debris resuspended in 10 mL buffer B/g wet cell debris (Buffer B: 50 mM TRIS/HCl; pH 8; 500 mM NaCl; 2 M Urea) and centrifuged again (15650 g; 20 min, 4° C.). The washing step using buffer B was repeated once. Afterwards, IBs/cell debris were resuspended in water (5 mL water/g wet cell debris), the suspension aliquoted into pre-weighed 50 mL reaction tubes, centrifuged (15650 g; 20 min, 4° C.) and the pellets stored at −20° C. until further use.

For solubilization, an aliquot of the frozen IBs was thawed, weighed in order to calculate the wet Inclusion Body (wIB) weight and resuspended in the appropriate solubilization buffer (50 mM TRIS/HCl; pH 8.5; 6 M Urea) to reach a wIB concentration of 100 g/L. After resuspension, DTT was added (using a 1 M DTT stock) to reach a final concentration in the solubilization mix of 7.11 mM DTT and the solubilization mix was incubated (4° C.; 0.5 h; slight agitation), followed by centrifugation (20379 g; 20 min; 4° C.). The supernatant was immediately used for refolding, the pellet discarded.

The solubilizate was diluted 1:40 in the appropriate refolding buffer (e.g. 20 mM TRIS/HCl pH 8.5, 2 M urea, 7% glycerol, 2 mM CaCl$_2$, 1.27 mM GSSG), to which hemin was added in a final concentration of 20 µM and refolding was carried out at 10° C. for 19 hours.

The proteins were further purified by hydrophobic interaction chromatography (HIC). A column packed with Butyl Sepharose 4 Fast Flow (GE Healthcare) with a bed volume of 80 ml was used. The column was equilibrated with Buffer A (Buffer A: 20 mM BisTris pH 7; 4 M NaCl) at a flow rate of 113 cm/h until all signals were constant. Then 1250-1300 mL load were applied at a flow rate of 90 cm/h. After the load, a wash step with 20% buffer B (Buffer B: 20 mM Bis-Tris pH 7) was performed at a flow rate of 90 cm/h for 2 CVs. Thereafter, a step elution was performed with 75% buffer B (flow rate 79 cm/h) and 100% (flow rate 90 cm/h) buffer B, with active HRP eluting at 75% buffer B.

Kinetic Parameters

Enzyme kinetic parameters were determined for the substrates ABTS, TMB and hydrogen peroxide in a 96-well plate assay using a Tecan Infinite M200 PRO instrument (Tecan, Mannedorf, Switzerland).

For measurements with 3,3',5,5'-tetramethylbenzidine (TMB) as substrate, the reaction mixture in each well of the 96-well plate contained a saturating hydrogen peroxide concentration of 1 mM and varying TMB concentrations (20-550 µM) in 50 mM phosphate-citrate buffer pH 5 in a final volume of 200 µL. Protein sample (5 µL) was mixed with 175 µl TMB-buffer mixture and the reaction was started with 20 µl hydrogen peroxide solution (10 mM). The increase in absorption was followed at 652 nm for 60s at 30°

C. in a Tecan Infinite M200 PRO instrument. The kinetic parameters were calculated using Sigma Plot software (Systat Software INC., San Jose, CA, USA) and an extinction coefficient of $\varepsilon_{652}$=39 mM$^{-1}$ cm$^{-1}$ (see Josephy, et al. "The horseradish peroxidase-catalyzed oxidation of 3, 5, 3', 5'-tetramethylbenzidine. Free radical and charge-transfer complex intermediates." Journal of Biological Chemistry 257.7 (1982): 3669-3675).

For measurements with ABTS as substrate, the reaction mixture in each well of the 96-well plate contained a saturating hydrogen peroxide concentration of 1 mM and varying ABTS concentrations (0.1-7 mM) in 50 mM phosphate-citrate buffer pH 5 in a final volume of 200 µL. Protein sample (5 µL) was mixed with 175 µl ABTS-buffer mixture and the reaction was started with 20 µl hydrogen peroxide solution (10 mM). The increase in absorption was followed at 420 nm for 120 s at 30° C. in a Tecan Infinite M200 PRO instrument. The kinetic parameters were calculated using Sigma Plot software (Systat Software INC., San Jose, CA, USA) and an extinction coefficient of $\varepsilon_{420}$=36 mM$^{-1}$ cm$^{-1}$ (see Childs and Bardsley. "The steady-state kinetics of peroxidase with 2, 2'-azino-di-(3-ethyl-benzthiazoline-6-sulphonic acid) as chromogen." Biochemical Journal 145.1 (1975): 93-103).

For measurements with hydrogen peroxide as substrate, the reaction mixture in each well of the 96-well plate contained a saturating ABTS concentration of 10 mM and varying hydrogen peroxide concentrations (0.001-1 mM) in 50 mM phosphate-citrate buffer pH 5 in a final volume of 200 µL. Protein sample (5 µL) was mixed with 145 µl hydrogen peroxide-buffer mixture and the reaction was started with 50 µl ABTS solution (40 mM). The increase in absorption was followed at 420 nm for 120 s at 30° C. in a Tecan Infinite M200 PRO instrument. The kinetic parameters were calculated using Sigma Plot software (Systat Software INC., San Jose, CA, USA) and an extinction coefficient of $\varepsilon_{420}$=36 mM$^{-1}$ cm$^{-1}$ (see Childs and Bardsley. "The steady-state kinetics of peroxidase with 2, 2'-azino-di-(3-ethyl-benzthiazoline-6-sulphonic acid) as chromogen." Biochemical Journal 145.1 (1975): 93-103).

Thermal Stability

The thermal stability of the enzyme variants was assessed at 60° C. in 50 mM BisTris/HCl pH 7, 7% glycerol, 500 mM NaCl. The enzymatic activity with ABTS was measured after 0, 30, 60, 90 and 120 min for HRP wild-type (SEQ ID NO: 2) and HRP N13D/N57S/N255D/N268D; after 0, 90, 180, 300, 420 and 588 min for variants HRP N13D/N57S/N175S/N255D/N268D, HRP N13D/N57S/P146Q/N175S/N255D/N268D, HRP N13D/N57S/N175S/N255D/N268D/N275K and HRP N13D/N57S/P146Q/N175S/N255D/N268D/N275K and after 0, 90, 180, 300 and 420 min for plant HRP. The enzyme concentration of all variants including plant HRP was 2.86 µM during the heat treatment. Afterwards the samples were cooled on ice for 5 min before centrifugation at 16162 g for 15 min at 4° C. Subsequently the residual activity was measured with 7 mM ABTS with a Tecan Infinite M200 PRO instrument. The reaction mixture contained 5 µL of protein, a saturating hydrogen peroxide concentration of 1 mM and 7 mM ABTS in 50 mM phosphate-citrate buffer pH 5 with a total volume of 200 µl. The increase in absorption was followed at 420 nm for 120 s at 30° C. The residual enzyme activity was plotted against incubation time and the half-life at 60° C. was calculated using the rate of inactivation in the following Equation:

$$t_{1/2}=\ln(2)/k_{in}$$

wherein $t_{1/2}$ is the half-life and kin is the slope of the logarithmic residual activity.

EXAMPLE 2. THERMAL STABILITY OF HRP MUTANTS

Several mutants of HRP were expressed and purified and thermostability was measured as described in Example 1. It was found that a number of mutations increased thermostability. The most preferred mutant HRP N13D/N57S/P146Q/N175S/N255D/N268D/N275K (SEQ ID NO: 4) displayed a more than 13-fold enhanced thermostability over wild-type HRP (SEQ ID NO: 2) and a 1.7-fold enhanced thermostability even over the plant-derived (i.e. glycosylated) enzyme. Importantly, for the combination of the mutations P146Q and N275K (HRP N13D/N57S/P146Q/N175S/N255D/N268D/N275K) a significantly greater thermostability was observed than for either mutation P146Q (HRP N13D/N57S/P146Q/N175S/N255D/N268D) or N275K (HRP N13D/N57S/N175S/N255D/N268D/N275K) alone.

TABLE 1

Thermal stability of plant HRP and recombinantly produced HRP variants.

| Variant | Half life at 60° C. [min] |
| --- | --- |
| plant HRP | 217 ± 3 |
| HRP wild-type (SEQ ID NO: 2) | 28 ± 1 |
| HRP N13D/N57S/N255D/N268D (disclosed in Humer and Spadiut 2019, supra) | 46 ± 1 |
| HRP N13D/N57S/N175S/N255D/N268D/N275K | 242 ± 2 |
| HRP N13D/N57S/P146Q/N175S/N255D/N268D | 267 ± 1 |
| HRP N13D/N57S/N175S/N255D/N268D | 396 ± 17 |
| HRP N13D/N57S/P146Q/N175S/N255D/N268D/N275K (SEQ ID NO: 4) | 376 ± 5 |

EXAMPLE 3. KINETIC PARAMETERS OF HRP MUTANTS

Several mutants of HRP were expressed and purified and the kinetic parameters for the substrates ABTS, TMB and hydrogen peroxide were determined as described in Example 1. HRP N13D/N57S/P146Q/N175S/N255D/N268D/N275K (SEQ ID NO: 4) was found to be significantly more active than HRP N13D/N57S/N175S/N255D/N268D with the substrates TMB and hydrogen peroxide. The mutations P146Q and N275K were found to have a strong beneficial effect on enzymatic activity.

TABLE 2

Kinetic parameters for the substrate TMB.

| Variant | Km [mM] | Vmax [U/mg] | kcat [s$^{-1}$] | kcat/Km [mM$^{-1}$ s$^{-1}$] |
| --- | --- | --- | --- | --- |
| HRP N13D/N57S/N175S/N255D/N268D | 0.064 ± 0.014 | 5628 ± 335 | 3236 ± 193 | 50856 ± 11539 |
| HRP N13D/N57S/P146Q/N175S/N255D/N268D/N275K (SEQ ID NO: 4) | 0.071 ± 0.017 | 7551 ± 509 | 4342 ± 292 | 61191 ± 15140 |

TABLE 3

Kinetic parameters for the substrate $H_2O_2$.

| Variant | Km [mM] | Vmax [U/mg] | kcat [s$^{-1}$] | kcat/Km [mM$^{-1}$ s$^{-1}$] |
|---|---|---|---|---|
| HRP N13D/N57S/N175S/N255D/N268D | 0.174 ± 0.004 | 2003 ± 14 | 1152 ± 8.3 | 6626 ± 160 |
| HRP N13D/N57S/P146Q/N175S/N255D/ N268D/N275K (SEQ ID NO: 4) | 0.171 ± 0.009 | 2337 ± 38 | 1344 ± 22 | 7873 ± 430 |

TABLE 4

Kinetic parameters for the substrate ABTS.

| Variant | Km [mM] | Vmax [U/mg] | kcat [s$^{-1}$] | kcat/Km [mM$^{-1}$ s$^{-1}$] |
|---|---|---|---|---|
| HRP N13D/N57S/N175S/N255D/N268D | 0.845 ± 0.27 | 1224 ± 115 | 786 ± 74 | 930 ± 308 |
| HRP N13D/N57S/P146Q/N175S/N255D/ N268D/N275K (SEQ ID NO: 4) | 0.765 ± 0.21 | 1214 ± 98 | 716 ± 58 | 936 ± 272 |

EXAMPLE 4. COMPARISON TO PLANT-DERIVED AND WILD-TYPE HRP

The kinetic parameters and thermal stability of HRP N13D/N57S/P146Q/N175S/N255D/N268D/N275K (SEQ ID NO: 4) was compared to those of wild-type HRP (SEQ ID NO: 2) as well as to the plant-derived HRP (pHRP). Kinetic parameters and thermal stability were determined as described in Example 1.

The measurement of the thermal stability is displayed in FIG. 1. As already described in Example 2 herein above, the most preferred mutant HRP N13D/N57S/P146Q/N175S/N255D/N268D/N275K (mHRP, SEQ ID NO: 4) displayed a more than 13-fold enhanced thermostability over wild-type HRP (rHRP, SEQ ID NO: 2) and a 1.7-fold enhanced thermostability even over the plant-derived (i.e. glycosylated) pHRP (see Table 1). Moreover, it was found that even with this strongly improved thermal stability, similar catalytic efficiencies to both wild-type HRP (rHRP, SEQ ID NO: 2) and plant-derived HRP were observed (see Tables 5 and 6 below).

TABLE 5

Kinetic parameters for the substrate ABTS.

| Variant | Km [mM] | Vmax [U/mg] | kcat [s$^{-1}$] | kcat/Km [mM$^{-1}$ s$^{-1}$] |
|---|---|---|---|---|
| pHRP | 0.70 ± 0.14 | 1285 ± 70 | 734 ± 41 | 1043 ± 215 |
| wild-type HRP (rHRP, SEQ ID NO: 2) | 0.49 ± 0.06 | 1411 ± 43 | 823 ± 25 | 1677 ± 205 |
| HRP N13D/N57S/P146Q/N175S/N255D/ N268D/N275K (mHRP, SEQ ID NO: 4) | 0.86 ± 0.23 | 1203 ± 96 | 702 ± 56 | 817 ± 228 |

TABLE 6

Kinetic parameters for the substrate TMB.

| Variant | Km [mM] | Vmax [U/mg] | kcat [s$^{-1}$] | kcat/Km [mM$^{-1}$ s$^{-1}$] |
|---|---|---|---|---|
| pHRP | 0.101 ± 0.020 | 7446 ± 528 | 4343 ± 308 | 42830 ± 8864 |
| wild-type HRP (rHRP, SEQ ID NO: 2) | 0.105 ± 0.014 | 7146 ± 355 | 4169 ± 207 | 39582 ± 5661 |
| HRP N13D/N57S/P146Q/N175S/N255D/ N268D/N275K (mHRP, SEQ ID NO: 4) | 0.109 ± 0.012 | 7360 ± 294 | 4293 ± 171 | 39518 ± 4498 |

EXAMPLE 5. SITE-SATURATION MUTAGENESIS OF POSITIONS 146 AND 275

In order to test the effect of all possible amino acid exchanges at positions P146 and N275, site-saturation mutagenesis of these positions was performed. As starting point for the site-saturation mutagenesis, the preferred mutant HRP N13D/N57S/P146Q/N175S/N255D/N268D/N275K (SEQ ID NO: 3) was selected. The effects of amino acid exchanges in the 146 and 275 positions were studied individually.

Library Generation

The following plasmids were constructed with standard molecular cloning techniques. Whole plasmid PCR of HRP N13D/N57S/P146Q/N175S/N255D/N268D/N275K (SEQ ID NO: 3) in pSF-T7 was used to introduce mutations in the hrp gene by site-saturation mutagenesis at position 146 and 275. The 6.3 kb fragment was amplified with the respective oligonucleotides to generate site-saturation libraries (Table 7). All oligonucleotides were purchased from Microsynth (Balgach, Switzerland). The oligonucleotides were phosphorylated according to following protocol: 300 pmol primer DNA, 1×T4 PNK buffer (NEB), 1 mM ATP, 5% PEG, 10 Units T4 polynucleotide kinase (PNK, NEB). The reaction was incubated at 37° C. for 45 min prior to heat inactivation at 65° C. for 20 min. Each PCR reaction contained 1×Q5 Reaction Buffer, 200 µM dNTP Mix, 200 nM of both forward and reverse phosphorylated primer, 100 ng template vector DNA and 1 U Q5 High-Fidelity DNA Polymerase. The PCR products were purified with the Monarch PCR & DNA Cleanup Kit from New England Biolabs (NEB, Ipswich, MA, USA) and the template plasmid DNA was removed by FastDigest DpnI (Thermo Scientific™, Waltham, MA, USA) digestion. 2 FDU (FastDigest unit) of DpnI was added to the cleaned PCR products and incubated for 4 h at 37° C. After heat inactivation at 80° C. for 20 min, the plasmids were blunt end ligated: 50 ng plasmid DNA, 1x T4 DNA ligase buffer (NEB), 400 cohesive end units T4 DNA ligase (NEB), 16° C. overnight. After heat inactivation for 20 min at 65° C. the plasmids were transformed into BL21 (DE3).

at 5000 g for 6 min at 4° C. with a Thermo-Fisher Lynx Sorvall centrifuge and the cells were resuspended thoroughly in 200 µl/well B-PER Bacterial Protein Extraction Reagent (Thermo Scientific, Waltham, MA, USA) with 5 U ml$^{-1}$ DNaseI and ½ Protease Inhibitor Cocktail Tablet (cOmplete Tablets, EDTA-free; Roche Diagnostics GmbH, Mannhein, Germany) and 200 mM $MgCl_2$. Cell lysis was performed for 15 min at RT before centrifugation at 5000 g, 4° C. for 20 min. Afterwards total protein content was measured with the Bradford method. 90 µl of each well were transferred to a new plate which was incubated at 80° C. for 20 min (position 146) or at 80° C. for 15 min (position 275), afterwards both the heated and the control plate were centrifuged again at 5000 g, 4° C. for 20 min. Subsequently, enzyme activity was measured with 395 µM TMB (position 146) or 406 µM TMB (position 275), 1 mM $H_2O_2$ and 10 µl cell lysate in 50 mM phosphate-citrate buffer pH 5 with a total volume of 200 µl. The measurements were performed at 30° C. and increase in absorbance at 652 nm (s=3.9×10$^4$ M$^{-1}$ cm$^{-1}$ for the blue TMB radical) was monitored for 120 s with a Tecan Infinite M200 PRO plate reader. Initial and residual activities were normalized using the total protein concentration and thermal stability was displayed as the ratio of residual to initial activity. 180 colonies were screened for each position, which corresponds to an expected library completeness of more than 99%. Each plate contained 6 colonies of HRP N13D/N57S/P146Q/N175S/N255D/N268D/N275K (corresponding to SEQ ID NO: 3) as positive control.

Results

Results of the selected mutants are given in Table 8 (position P146) and Table 9 (position N275) below. Since the present Example uses a 96-well plate-based screening

TABLE 7

Primers used for whole plasmid PCR.

| Name | Sequence (5'->3' Direction) |
| --- | --- |
| DHU_P146deg3_fwd (SEQ ID NO: 5) | TTTCACGCTGNNKCAACTGAAAGATAGC |
| DHU_P146deg3_rev (SEQ ID NO: 6) | AACGGAGCCGGCAGATTAGCGTTT |
| DHU_N275deg3_fwd (SEQ ID NO: 7) | GACGTTTTTCNNKGCATTCGTCGAAGC |
| DHU_N275deg3_rev (SEQ ID NO: 8) | TGGGTCGAATCGGCAAATGAACG |

Screening

Positive transformants were picked from the selection plates and grown in 96-well plates with 200 µl SB medium (32 g L$^{-1}$ tryptone; 20 g L$^{-1}$ yeast extract; 5 g L$^{-1}$ NaCl; 5 mM NaOH; 50 mg L$^{-1}$ kanamycin) for 16 h at 37° C., 250 rpm in a plastic box to prevent desiccation. Subsequently, 90 µl 75% glycerol was added to the master plates before they were stored at −80° C. The slave plates containing 190 µl SB medium were inoculated with 10 µl of the master plates. Here, the medium contained 2 mM $CaCl_2$; 6 µM hemin and 0.1 mM IPTG in a final volume of 200 µl. The cells were grown for 16 h at 25° C., 250 rpm in a plastic box and cell density was determined by measuring the absorption at 600 nm with a Tecan Infinite M200 PRO (Tecan, Mannedorf, Switzerland) plate reader. Then the plates were centrifuged assay, variability (standard deviation) is higher than with other assays reported herein. Therefore, results for each mutant should only be compared within each plate measured.

As can been seen from Tables 8 and 9, multiple different amino acid exchanges in positions 146 and 275 were found to lead to excellent thermal stability. Several amino acid exchanges in each position gave advantageous results. In the case of position 146, 146A, 146R, 146V, 146E and especially 146Q were found to be particularly advantageous (all within the standard deviation of the most preferred mutant 146Q). In the case of position 275, the best results were observed for 275R, 275D, 275S, 275Q, 275A, 275E and especially 275K (all within the standard deviation of the most preferred mutant 275K).

TABLE 8

Selected mutants resulting from site saturation mutagenesis at position 146. Two separate plates were measured (results should be compared within each plate). Certain mutants contained the same amino acid exchange. For the controls (SEQ ID NO: 3) the average and standard deviation from six replicates are given.

| Amino acid exchange | U/mg total protein | Residual activity |
|---|---|---|
| PLATE 1: | | |
| 146Q (control) | 0.056 ± 0.008 | 49% ± 14% |
| 146A | 0.054 | 50% |
| 146E | 0.048 | 53% |
| 146R | 0.052 | 60% |
| 146R | 0.053 | 59% |
| 146Q | 0.057 | 60% |
| PLATE 2: | | |
| 146Q (control) | 0.058 ± 0.004 | 74% ± 6% |
| 146V | 0.049 | 75% |
| 146Q | 0.059 | 77% |
| 146Q | 0.057 | 77% |
| 146Q | 0.056 | 82% |

TABLE 9

Selected mutants resulting from site saturation mutagenesis at position 275. Two separate plates were measured (results should be compared within each plate). Certain mutants contained the same amino acid exchange. For the controls (SEQ ID NO: 3) the average and standard deviation from six replicates are given.

| Amino acid exchange | U/mg total protein | Residual activity |
|---|---|---|
| PLATE 1: | | |
| 275K (control) | 0.062 ± 0.006 | 96% ± 31% |
| K275A | 0.041 | 98% |
| PLATE 2: | | |
| 275K (control) | 0.073 ± 0.017 | 92% ± 27% |
| 275R | 0.063 | 90% |
| 275E | 0.1 | 100% |
| 275R | 0.071 | 100% |
| 275D | 0.08 | 100% |
| 275A | 0.064 | 98% |

EXAMPLE 6. KINETIC PARAMETERS AND THERMAL STABILITY OF HRP MUTANTS

The beneficial effect of mutations at positions P146 and N275 was investigated in the light of wild-type HRP (SEQ ID NO: 2), HRP N175S and HRP N13D/N57S/N175S/N255D/N268D. Furthermore, the beneficial effects of single mutants and combinations thereof was examined. In this context, the role of mutations at positions P146 and N275 on the biochemical properties was determined by the measurement of specific enzyme activity and thermal stability at 60° C.

Materials and Methods

The following mutants of wild-type HRP (SEQ ID NO: 2) were created and verified by Sanger-Sequencing: HRP P146Q, HRP N175S, HRP N275K, HRP P146Q/N275K, HRP P146Q/N175S, HRP N175S/N275K, HRP P146Q/N175S/N275K. Purification was carried out as described in Example 1. Kinetic parameters and thermal stability were also determined as described in Example 1.

Specific Enzyme Activity (ABTS)

The specific activity in Units/mg protein of all HRP variants was tested with the substrate ABTS in a Tecan plate reader (Table 10). HRP P146Q showed a 1.4-fold higher specific activity in relation to HRP wild-type. Interestingly, HRP N175S showed a lower specific activity; however, HRP N13D/N57S/P146Q/N175S/N255D/N268D/N275K (SEQ ID NO: 4) was able to counteract this activity reduction and restored it to HRP wild-type values.

TABLE 10

Specific activity of selected HRP variants with ABTS as substrate compared to HRP wild-type and HRP N13D/N57S/P146Q/N175S/N255D/N268D/N275K.

| HRP variants | Specific activity [U/mg] |
|---|---|
| HRP wild-type (SEQ ID NO: 2) | 962 ± 108 |
| HRP N13D/N57S/P146Q/N175S/N255D/N268D/N275K (SEQ ID NO: 4) | 875 ± 81 |
| HRP P146Q | 1391 ± 115 |
| HRP N175S | 693 ± 77 |
| HRP N275K | 956 ± 58 |
| HRP P146Q/N275K | 974 ± 75 |
| HRP P146Q/N175S | 637 ± 47 |
| HRP N175S/N275K | 601 ± 94 |
| HRP P146Q/N175S/N275K | 637 ± 44 |

Specific Enzyme Activity ($H_2O_2$)

Furthermore, the specific activity in Units/mg protein was determined with the substrate hydrogen peroxide. Here, the trend was the same as observed for the data for ABTS, where the variant P146Q led to an increase in specific activity and introduction of N175S led to lower values. This was also the case for the double mutants P146Q/N175S and N175S/N275K as well as the triple mutant P146Q/N175S/N275K. When N175S was missing or when the additional mutations of SEQ ID NO: 4 were present, the specific activity was comparable or even better than SEQ ID NO: 2.

TABLE 11

Specific activity of selected HRP variants with $H_2O_2$ as substrate compared to HRP wild-type and HRP N13D/N57S/P146Q/N175S/N255D/N268D/N275K.

| HRP variants | Specific activity [U/mg] |
|---|---|
| HRP wild-type (SEQ ID NO: 2) | 1151 ± 113 |
| HRP N13D/N57S/P146Q/N175S/N255D/N268D/N275K (SEQ ID NO: 4) | 983 ± 104 |
| HRP P146Q | 1522 ± 133 |
| HRP N175S | 734 ± 54 |
| HRP N275K | 1258 ± 90 |
| HRP P146Q/N275K | 1027 ± 31 |
| HRP P146Q/N175S | 756 ± 25 |
| HRP N175S/N275K | 711 ± 35 |
| HRP P146Q/N175S/N275K | 718 ± 28 |

Specific Enzyme Activity (TMB)

Concerning the substrate TMB the differences in specific activity between the HRP variants were less pronounced. However, P146Q again showed a significant increase in specific enzyme activity, whereas N175S showed the lowest U/mg relative to the wild-type.

TABLE 12

Specific activity of selected HRP variants with TMB as substrate compared to HRP wild-type and HRP N13D/N57S/P146Q/N175S/N255D/N268D/N275K.

| HRP variants | Specific activity [U/mg] |
|---|---|
| HRP wild-type (SEQ ID NO: 2) | 6316 ± 434 |
| HRP N13D/N57S/P146Q/N175S/N255D/N268D/N275K (SEQ ID NO: 4) | 5836 ± 552 |
| HRP P146Q | 7781 ± 411 |
| HRP N175S | 5312 ± 152 |
| HRP N275K | 5974 ± 495 |
| HRP P146Q/N275K | 5699 ± 294 |
| HRP P146Q/N175S | 5329 ± 122 |
| HRP N175S/N275K | 5465 ± 520 |
| HRP P146Q/N175S/N275K | 5227 ± 90 |

Thermal Stability

The enzyme stability at 60° C. was investigated for all HRP mutants and surprisingly N175S was not solely responsible for the increased stability at high temperatures. HRP N13D/N57S/N255D/N268D increased the enzyme half life 1.5-fold, whereas HRP N175S enhanced stability by 7.7-fold, once they were combined the stability was raised 13-fold relative to HRP wild-type, suggesting a synergistic effect (Table 13). Due to the fact that HRP N13D/N57S/N175S/N255D/N268D and HRP N13D/N57S/P146Q/N175S/N255D/N268D/N275K (SEQ ID NO: 4) showed comparable stability it may be assumed that the quadruple mutant in combination with N175S was responsible for this enhancement.

For P146Q and N275K the stability of the single mutants and the double mutant P146Q/N275K was slightly reduced relative to HRP wild-type. However, the triple mutant P146Q/N175S/N275K showed the same stability as N175S alone, whereas the double mutants P146Q/N175S and N175S/N275K were less stable. This indicates an unfavorable effect on stability when only one of the mutants is combined with N175S, which is alleviated in combination, suggesting a synergistic effect between P146Q, N275K, and N175S. The same effect can also be seen for HRP N13D/N57S/P146Q/N175S/N255D/N268D and HRP N13D/N57S/N175S/N255D/N268D/N275K when compared to HRP N13D/N57S/P146Q/N175S/N255D/N268D/N275K (SEQ ID NO: 4).

TABLE 13

Thermal stability of several HRP variants depicted as half life at 60° C. Grey shaded data are taken from Example 2 for comparison.

| HRP variants | $t_{1/2}$ at 60° C. [min] |
|---|---|
| HRP wild-type (SEQ ID NO: 2) | 30 ± 3 |
| HRP N13D/N57S/P146Q/N175S/N255D/N268D/N275K (SEQ ID NO: 4) | 378 ± 11 |
| HRP P146Q | 25 ± 0.5 |
| HRP N275K | 23 ± 1 |
| HRP P146Q/N275K | 25 ± 1 |
| HRP P146Q/N175S | 178 ± 1 |
| HRP N175S/N275K | 166 ± 1 |
| HRP P146Q/N175S/N275K | 236 ± 1 |
| HRP N175S | 232 ± 3 |
| HRP N13D/N57S/N255D/N268D | 46 ± 0.5 |
| HRP N13D/N57S/P146Q/N175S/N255D/N268D | 267 ± 1.4 |
| HRP N13D/N57S/N175S/N255D/N268D/N275K | 242 ± 2 |
| HRP N13D/N57S/N175S/N255D/N268D | 396 ± 17 |

CONCLUSION

It was found that the substitution P146Q on its own led to a strong increase in HRP enzyme activity for all substrates tested. For instance, for the substrate ABTS the increase amounted to a 1.4-fold increase relative to the wild-type enzyme (SEQ ID NO: 2) and a 2-fold higher specific activity when compared to HRP N175S.

The substitution N175S was found to strongly increase thermal stability of HRP. This effect was observed for N175S on its own and even more strongly in combination with the mutated N-glycosylation site amino acids N13D/N57S/N255D/N268D, where a synergistic effect was observed. The combination of the single mutation P146Q or the single mutation N275K with N175S led to a slight stability reduction; however, when both P146Q and N275K were combined with N175S the reduction was alleviated, suggesting a synergistic effect between P146Q, N275K, and N175S.

N175S was found to reduce enzyme activity with several substrates. This effect was, however, counteracted by N13D/N57S/P146Q/N175S/N255D/N268D/N275K (SEQ ID NO: 4). Thus, this mutant provides a combination of high thermal stability and optimal kinetic performance.

The invention claimed is:

1. A polypeptide having peroxidase activity and comprising an amino acid sequence having at least 95% sequence identity to SEQ ID NO: 3, wherein said amino acid sequence comprises at least one amino acid exchange compared to SEQ ID NO: 1, wherein said at least one amino acid exchange is selected from the group consisting of P146Q, P146A, P146R, P146V, and P146E.

2. The polypeptide according to claim 1, wherein said at least one amino acid exchange is P146Q.

3. The polypeptide according to claim 1, wherein said amino acid sequence further comprises an amino acid exchange selected from the group consisting of N275K, N275R, N275D, N275S, N275Q, N275A and N275E; compared to SEQ ID NO: 1.

4. The polypeptide according to claim 3, wherein said amino acid sequence comprises the amino acid exchange P146Q compared to SEQ ID NO: 1.

5. The polypeptide according to claim 3, wherein said amino acid sequence comprises the amino acid exchange N275K compared to SEQ ID NO: 1.

6. The polypeptide according to claim 3, wherein said amino acid sequence comprises the amino acid exchanges P146Q and N275K compared to SEQ ID NO: 1.

7. The polypeptide according to claim 3, wherein said amino acid sequence has at least 98%, or at least 99% sequence identity to SEQ ID NO: 3; or wherein said amino acid sequence is the sequence as set forth in SEQ ID NO: 3.

8. The polypeptide according to claim 1, wherein said amino acid sequence further comprises at least one, or at least two, or at least three, or at least four, or 5 amino acid exchanges compared to SEQ ID No: 1 selected from the group consisting of N13D, N57S, N175S, N255D, and N268D.

9. The polypeptide according to claim 1, wherein the peroxidase activity corresponds to a kcat/Km value for the substrate 3,3',5,5'-tetramethylbenzidine (TMB) of at least 0.01 $mM^{-1}s^{-1}$, or at least 0.1 $mM^{-1}s^{-1}$, or at least 1 $mM^{-1}s^{-1}$, even more preferably or at least 10 $mM^{-1}s^{-1}$, or at least 20 $mM^{-1}s^{-1}$, or at least 100 $mM^{-1}s^{-1}$, or at least 1000 $mM^{-1}s^{1}$, or at least 10000 $mM^{-1}s^{-1}$, or at least 20000 $mM^{-1}s^{-1}$, when measured in 50 mM phosphate-citrate buffer containing 1 mM $H_2O_2$ at pH 5 and 30° C.

10. The polypeptide according to claim 1, wherein a polypeptide consisting of said amino acid sequence has an increased thermostability with respect to a polypeptide consisting of the amino acid sequence as set forth in SEQ ID NO: 2.

11. The polypeptide according to claim 1, wherein a polypeptide consisting of said amino acid sequence has a half-life at 60° C. of at least 0.5 hours, or at least 1 hour, or at least 2 hours, or at least 4 hours, or at least 6 hours in a buffer consisting of 20 mM BisTris/HCl pH 7, 7% glycerol and 500 mM NaCl, as measured by the residual peroxidase activity with 7 mM ABTS in 50 mM phosphate-citrate buffer containing 1 mM $H_2O_2$ at pH 5 and 30° C.

12. A composition comprising the polypeptide according to claim 1.

13. A kit comprising the polypeptide of claim 1.

14. The kit according to claim 13, further comprising a crosslinker suitable for conjugating the polypeptide to another protein.

* * * * *

SEQUENCE LISTING

```
<160> NUMBER OF SEQ ID NOS: 8

<210> SEQ ID NO 1
<211> LENGTH: 306
<212> TYPE: PRT
<213> ORGANISM: Armoracia rusticana

<400> SEQUENCE: 1

Gln Leu Thr Pro Thr Phe Tyr Asp Asn Ser Cys Pro Asn Val Ser Asn
1               5                   10                  15

Ile Val Arg Asp Thr Ile Val Asn Glu Leu Arg Ser Asp Pro Arg Ile
            20                  25                  30

Ala Ala Ser Ile Leu Arg Leu His Phe His Asp Cys Phe Val Asn Gly
        35                  40                  45

Cys Asp Ala Ser Ile Leu Leu Asp Asn Thr Thr Ser Phe Arg Thr Glu
    50                  55                  60
```

Lys Asp Ala Phe Gly Asn Ala Asn Ser Ala Arg Gly Phe Pro Val Ile
65                  70                  75                  80

Asp Arg Met Lys Ala Ala Val Glu Ser Ala Cys Pro Arg Thr Val Ser
            85                  90                  95

Cys Ala Asp Leu Leu Thr Ile Ala Ala Gln Gln Ser Val Thr Leu Ala
            100                 105                 110

Gly Gly Pro Ser Trp Arg Val Pro Leu Gly Arg Arg Asp Ser Leu Gln
            115                 120                 125

Ala Phe Leu Asp Leu Ala Ala Asn Leu Pro Ala Pro Phe Phe Thr
            130                 135                 140

Leu Pro Gln Leu Lys Asp Ser Phe Arg Asn Val Gly Leu Asn Arg Ser
145                 150                 155                 160

Ser Asp Leu Val Ala Leu Ser Gly Gly His Thr Phe Gly Lys Asn Gln
            165                 170                 175

Cys Arg Phe Ile Met Asp Arg Leu Tyr Asn Phe Ser Asn Thr Gly Leu
            180                 185                 190

Pro Asp Pro Thr Leu Asn Thr Thr Tyr Leu Gln Thr Leu Arg Gly Leu
            195                 200                 205

Cys Pro Leu Asn Gly Asn Leu Ser Ala Leu Val Asp Phe Asp Leu Arg
210                 215                 220

Thr Pro Thr Ile Phe Asp Asn Lys Tyr Tyr Val Asn Leu Glu Glu Gln
225                 230                 235                 240

Lys Gly Leu Ile Gln Ser Asp Gln Glu Leu Phe Ser Ser Pro Asn Ala
            245                 250                 255

Thr Asp Thr Ile Pro Leu Val Arg Ser Phe Ala Asn Ser Thr Gln Thr
            260                 265                 270

Phe Phe Asn Ala Phe Val Glu Ala Met Asp Arg Met Gly Asn Ile Thr
            275                 280                 285

Pro Leu Thr Gly Thr Gln Gly Gln Ile Arg Leu Asn Cys Arg Val Val
            290                 295                 300

Asn Ser
305

<210> SEQ ID NO 2
<211> LENGTH: 307
<212> TYPE: PRT
<213> ORGANISM: Artificial Sequence
<220> FEATURE:
<223> OTHER INFORMATION: recombinant wt HRP

<400> SEQUENCE: 2

Met Gln Leu Thr Pro Thr Phe Tyr Asp Asn Ser Cys Pro Asn Val Ser
1               5                   10                  15

Asn Ile Val Arg Asp Thr Ile Val Asn Glu Leu Arg Ser Asp Pro Arg
            20                  25                  30

Ile Ala Ala Ser Ile Leu Arg Leu His Phe His Asp Cys Phe Val Asn
            35                  40                  45

Gly Cys Asp Ala Ser Ile Leu Leu Asp Asn Thr Thr Ser Phe Arg Thr
50                  55                  60

Glu Lys Asp Ala Phe Gly Asn Ala Asn Ser Ala Arg Gly Phe Pro Val
65                  70                  75                  80

Ile Asp Arg Met Lys Ala Ala Val Glu Ser Ala Cys Pro Arg Thr Val
            85                  90                  95

Ser Cys Ala Asp Leu Leu Thr Ile Ala Ala Gln Gln Ser Val Thr Leu
            100                 105                 110

```
Ala Gly Gly Pro Ser Trp Arg Val Pro Leu Gly Arg Arg Asp Ser Leu
            115                 120                 125

Gln Ala Phe Leu Asp Leu Ala Asn Ala Asn Leu Pro Ala Pro Phe Phe
    130                 135                 140

Thr Leu Pro Gln Leu Lys Asp Ser Phe Arg Asn Val Gly Leu Asn Arg
145                 150                 155                 160

Ser Ser Asp Leu Val Ala Leu Ser Gly Gly His Thr Phe Gly Lys Asn
                165                 170                 175

Gln Cys Arg Phe Ile Met Asp Arg Leu Tyr Asn Phe Ser Asn Thr Gly
            180                 185                 190

Leu Pro Asp Pro Thr Leu Asn Thr Thr Tyr Leu Gln Thr Leu Arg Gly
            195                 200                 205

Leu Cys Pro Leu Asn Gly Asn Leu Ser Ala Leu Val Asp Phe Asp Leu
        210                 215                 220

Arg Thr Pro Thr Ile Phe Asp Asn Lys Tyr Tyr Val Asn Leu Glu Glu
225                 230                 235                 240

Gln Lys Gly Leu Ile Gln Ser Asp Gln Glu Leu Phe Ser Ser Pro Asn
                245                 250                 255

Ala Thr Asp Thr Ile Pro Leu Val Arg Ser Phe Ala Asn Ser Thr Gln
            260                 265                 270

Thr Phe Phe Asn Ala Phe Val Glu Ala Met Asp Arg Met Gly Asn Ile
    275                 280                 285

Thr Pro Leu Thr Gly Thr Gln Gly Gln Ile Arg Leu Asn Cys Arg Val
        290                 295                 300

Val Asn Ser
305

<210> SEQ ID NO 3
<211> LENGTH: 306
<212> TYPE: PRT
<213> ORGANISM: Artificial Sequence
<220> FEATURE:
<223> OTHER INFORMATION: HRP N13D/N57S/P146Q/N175S/N255D/N268D/N275K

<400> SEQUENCE: 3

Gln Leu Thr Pro Thr Phe Tyr Asp Asn Ser Cys Pro Asp Val Ser Asn
1               5                   10                  15

Ile Val Arg Asp Thr Ile Val Asn Glu Leu Arg Ser Asp Pro Arg Ile
            20                  25                  30

Ala Ala Ser Ile Leu Arg Leu His Phe His Asp Cys Phe Val Asn Gly
        35                  40                  45

Cys Asp Ala Ser Ile Leu Leu Asp Ser Thr Thr Ser Phe Arg Thr Glu
    50                  55                  60

Lys Asp Ala Phe Gly Asn Ala Asn Ser Ala Arg Gly Phe Pro Val Ile
65                  70                  75                  80

Asp Arg Met Lys Ala Ala Val Glu Ser Ala Cys Pro Arg Thr Val Ser
                85                  90                  95

Cys Ala Asp Leu Leu Thr Ile Ala Ala Gln Gln Ser Val Thr Leu Ala
            100                 105                 110

Gly Gly Pro Ser Trp Arg Val Pro Leu Gly Arg Arg Asp Ser Leu Gln
        115                 120                 125

Ala Phe Leu Asp Leu Ala Asn Ala Asn Leu Pro Ala Pro Phe Phe Thr
    130                 135                 140

Leu Gln Gln Leu Lys Asp Ser Phe Arg Asn Val Gly Leu Asn Arg Ser
145                 150                 155                 160
```

-continued

Ser Asp Leu Val Ala Leu Ser Gly Gly His Thr Phe Gly Lys Ser Gln
            165                 170                 175

Cys Arg Phe Ile Met Asp Arg Leu Tyr Asn Phe Ser Asn Thr Gly Leu
        180                 185                 190

Pro Asp Pro Thr Leu Asn Thr Thr Tyr Leu Gln Thr Leu Arg Gly Leu
        195                 200                 205

Cys Pro Leu Asn Gly Asn Leu Ser Ala Leu Val Asp Phe Asp Leu Arg
    210                 215                 220

Thr Pro Thr Ile Phe Asp Asn Lys Tyr Tyr Val Asn Leu Glu Glu Gln
225                 230                 235                 240

Lys Gly Leu Ile Gln Ser Asp Gln Glu Leu Phe Ser Ser Pro Asp Ala
                245                 250                 255

Thr Asp Thr Ile Pro Leu Val Arg Ser Phe Ala Asp Ser Thr Gln Thr
            260                 265                 270

Phe Phe Lys Ala Phe Val Glu Ala Met Asp Arg Met Gly Asn Ile Thr
        275                 280                 285

Pro Leu Thr Gly Thr Gln Gly Gln Ile Arg Leu Asn Cys Arg Val Val
    290                 295                 300

Asn Ser
305

<210> SEQ ID NO 4
<211> LENGTH: 307
<212> TYPE: PRT
<213> ORGANISM: Artificial Sequence
<220> FEATURE:
<223> OTHER INFORMATION: recombinant HRP
      N13D/N57S/P146Q/N175S/N255D/N268D/N275K

<400> SEQUENCE: 4

Met Gln Leu Thr Pro Thr Phe Tyr Asp Asn Ser Cys Pro Asp Val Ser
1               5                   10                  15

Asn Ile Val Arg Asp Thr Ile Val Asn Glu Leu Arg Ser Asp Pro Arg
            20                  25                  30

Ile Ala Ala Ser Ile Leu Arg Leu His Phe His Asp Cys Phe Val Asn
        35                  40                  45

Gly Cys Asp Ala Ser Ile Leu Leu Asp Ser Thr Thr Ser Phe Arg Thr
    50                  55                  60

Glu Lys Asp Ala Phe Gly Asn Ala Asn Ser Ala Arg Gly Phe Pro Val
65                  70                  75                  80

Ile Asp Arg Met Lys Ala Ala Val Glu Ser Ala Cys Pro Arg Thr Val
                85                  90                  95

Ser Cys Ala Asp Leu Leu Thr Ile Ala Ala Gln Gln Ser Val Thr Leu
            100                 105                 110

Ala Gly Gly Pro Ser Trp Arg Val Pro Leu Gly Arg Arg Asp Ser Leu
        115                 120                 125

Gln Ala Phe Leu Asp Leu Ala Asn Ala Asn Leu Pro Ala Pro Phe Phe
    130                 135                 140

Thr Leu Gln Gln Leu Lys Asp Ser Phe Arg Asn Val Gly Leu Asn Arg
145                 150                 155                 160

Ser Ser Asp Leu Val Ala Leu Ser Gly Gly His Thr Phe Gly Lys Ser
            165                 170                 175

Gln Cys Arg Phe Ile Met Asp Arg Leu Tyr Asn Phe Ser Asn Thr Gly
        180                 185                 190

Leu Pro Asp Pro Thr Leu Asn Thr Thr Tyr Leu Gln Thr Leu Arg Gly
    195                 200                 205

Leu Cys Pro Leu Asn Gly Asn Leu Ser Ala Leu Val Asp Phe Asp Leu
    210                 215                 220

Arg Thr Pro Thr Ile Phe Asp Asn Lys Tyr Tyr Val Asn Leu Glu Glu
225                 230                 235                 240

Gln Lys Gly Leu Ile Gln Ser Asp Gln Glu Leu Phe Ser Ser Pro Asp
                245                 250                 255

Ala Thr Asp Thr Ile Pro Leu Val Arg Ser Phe Ala Asp Ser Thr Gln
            260                 265                 270

Thr Phe Phe Lys Ala Phe Val Glu Ala Met Asp Arg Met Gly Asn Ile
        275                 280                 285

Thr Pro Leu Thr Gly Thr Gln Gly Gln Ile Arg Leu Asn Cys Arg Val
    290                 295                 300

Val Asn Ser
305

<210> SEQ ID NO 5
<211> LENGTH: 28
<212> TYPE: DNA
<213> ORGANISM: Artificial Sequence
<220> FEATURE:
<223> OTHER INFORMATION: DHU_P146deg3_fwd
<220> FEATURE:
<221> NAME/KEY: misc_difference
<222> LOCATION: 11
<223> OTHER INFORMATION: /note="a or g or c or t"
<220> FEATURE:
<221> NAME/KEY: misc_difference
<222> LOCATION: 12
<223> OTHER INFORMATION: /note="a or g or c or t"

<400> SEQUENCE: 5
tttcacgctg nnkcaactga aagatagc                                        28

<210> SEQ ID NO 6
<211> LENGTH: 24
<212> TYPE: DNA
<213> ORGANISM: Artificial Sequence
<220> FEATURE:
<223> OTHER INFORMATION: DHU_P146deg3_rev

<400> SEQUENCE: 6
aacggagccg gcagattagc gttt                                            24

<210> SEQ ID NO 7
<211> LENGTH: 27
<212> TYPE: DNA
<213> ORGANISM: Artificial Sequence
<220> FEATURE:
<223> OTHER INFORMATION: DHU_N275deg3_fwd
<220> FEATURE:
<221> NAME/KEY: misc_difference
<222> LOCATION: 11
<223> OTHER INFORMATION: /note="a or g or c or t"
<220> FEATURE:
<221> NAME/KEY: misc_difference
<222> LOCATION: 12
<223> OTHER INFORMATION: /note="a or g or c or t"

<400> SEQUENCE: 7
gacgtttttc nnkgcattcg tcgaagc                                         27

<210> SEQ ID NO 8
<211> LENGTH: 23
<212> TYPE: DNA
<213> ORGANISM: Artificial Sequence

```
<220> FEATURE:
<223> OTHER INFORMATION: DHU_N275deg3_rev

<400> SEQUENCE: 8
tgggtcgaat cggcaaatga acg                                           23
```